United States Patent [19]

Ueno et al.

[11] Patent Number: 4,951,140
[45] Date of Patent: Aug. 21, 1990

[54] IMAGE ENCODING APPARATUS

[75] Inventors: Hideyuki Ueno, Fujisawa; Kenshi Dachiku, Tokyo, both of Japan

[73] Assignee: Kabushiki Kaisha Toshiba, Kawasaki, Japan

[21] Appl. No.: 313,941

[22] Filed: Feb. 22, 1989

[30] Foreign Application Priority Data

Feb. 22, 1988 [JP] Japan ................................. 63-37434
May 30, 1988 [JP] Japan ................................. 63-132301
Aug. 5, 1988 [JP] Japan ................................. 63-194520
Sep. 19, 1988 [JP] Japan ................................. 63-232216

[51] Int. Cl.$^5$ ............................................. H04N 7/13
[52] U.S. Cl. .................................... 358/136; 358/105
[58] Field of Search ................. 358/105, 133, 135, 136

[56] References Cited

U.S. PATENT DOCUMENTS 4,369,464  1/1983  Temime ............................. 358/136
4,494,144  1/1985  Brown ................................ 358/105

OTHER PUBLICATIONS

SPIE vol. 804 Advances in Image Processing pp. 379-384 "An Image Knowledge Based Video Codec for Low Bitrates"; R.H.J.M. Plompen et al; Mar. 31, 1987.
Technical Report of the Institute of Televison Engineers of Japan IPA 87-39; Y. Nagashima et al; 1987/Jaspanese Patent Disclosure (Kokai No. 63-187889).
National Conference Record, 1987 Information and Systems. The Institute of Electronics, Information and Communication Engineers.

Primary Examiner—Howard W. Britton
Attorney, Agent, or Firm—Oblon, Spivak, McClelland, Maier & Neustadt

[57] ABSTRACT

An image encoding apparatus has a memory for storing image data corresponding to an object for every frame, and a face region detecting circuit for detecting a difference between input frame image data and preceding frame image data, and extracting image data of a face region of the object on the basis of the difference data. More bits are allocated to the extracted face region than those to the remaining image region.

20 Claims, 36 Drawing Sheets

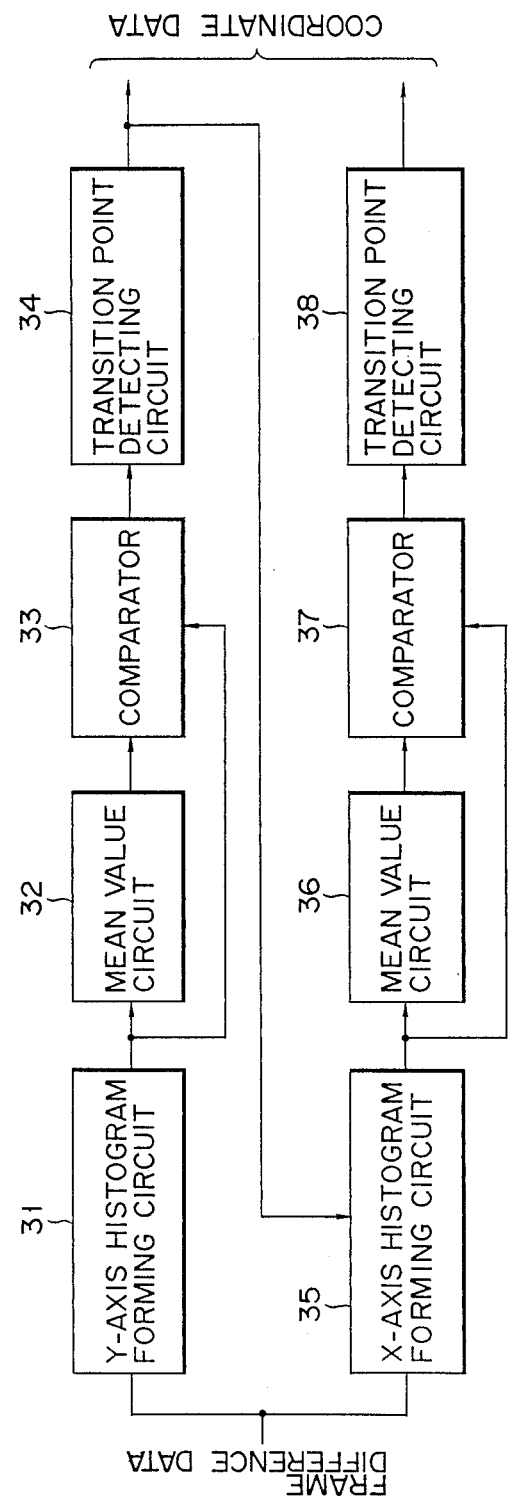

FACE DETECTION RESULT
FACE : SWITCH UP
NON FACE : SWITCH DOWN

FRAME DIFFERENCE IMAGE

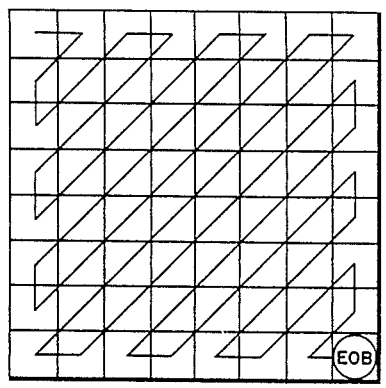
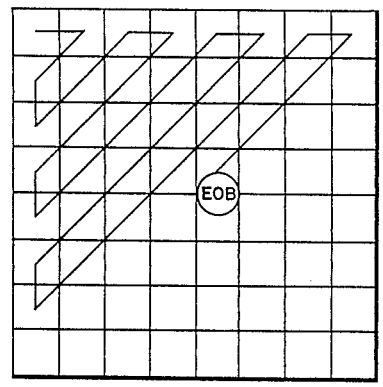
F I G. 13A      F I G. 13B

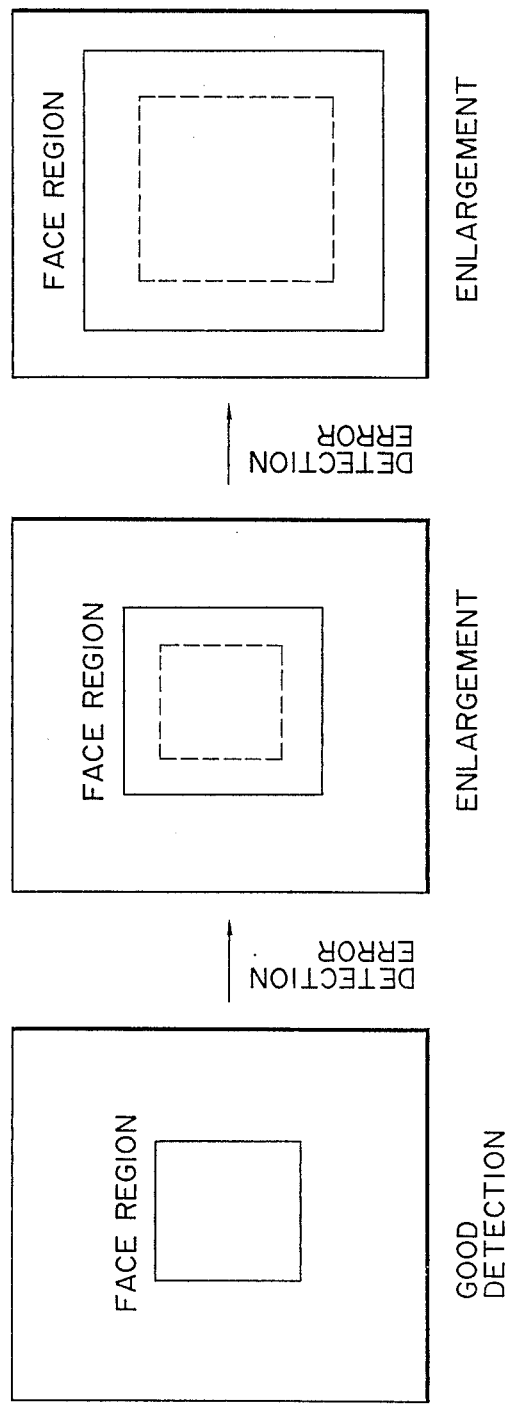
F I G. 15

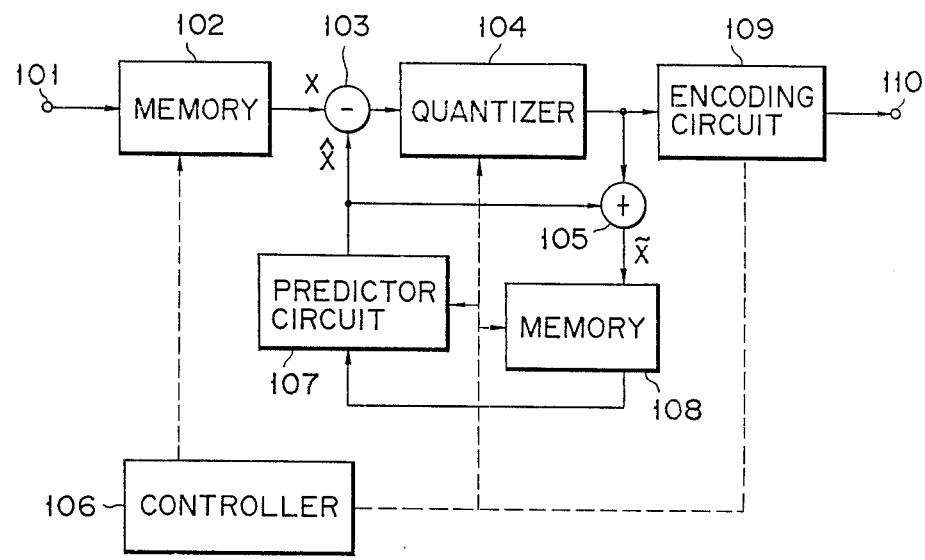
F I G. 16
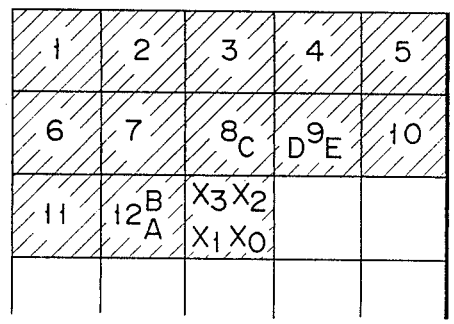
F I G. 17

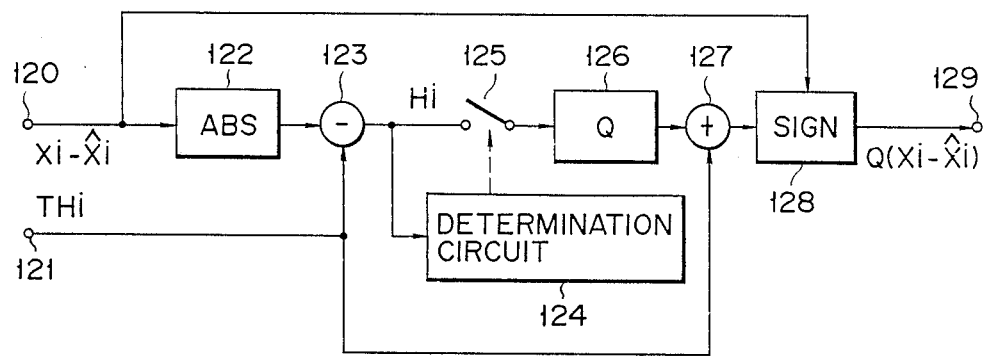
FIG. 18
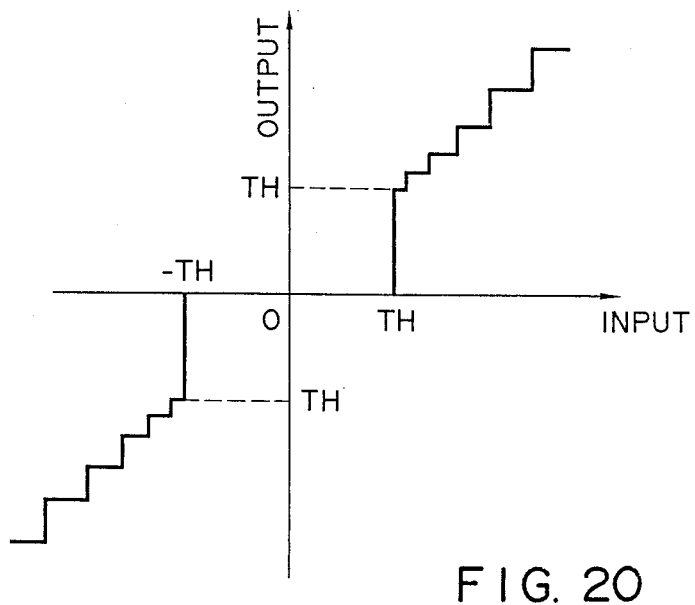
FIG. 20
FIG. 19
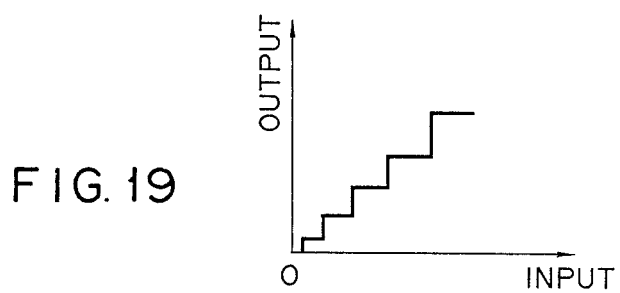

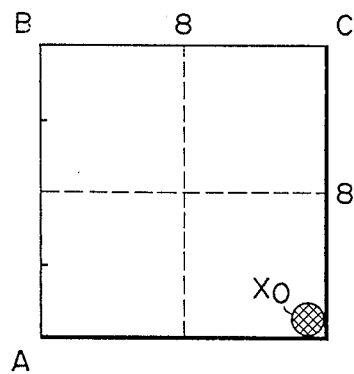
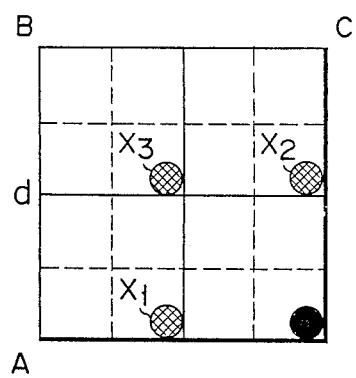
FIG. 21A  FIG. 21B
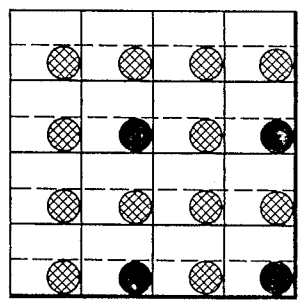
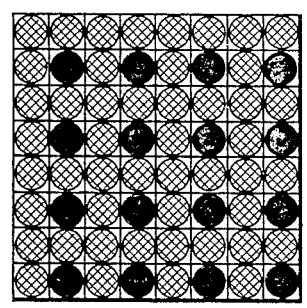
FIG. 21C  FIG. 21D
FIG. 22
| $X_6$ | $X_7$ | $X_8$ |
|---|---|---|
| $X_5$ | $X_3$ | $X_2$ |
| $X_4$ | $X_1$ | $X_0$ |

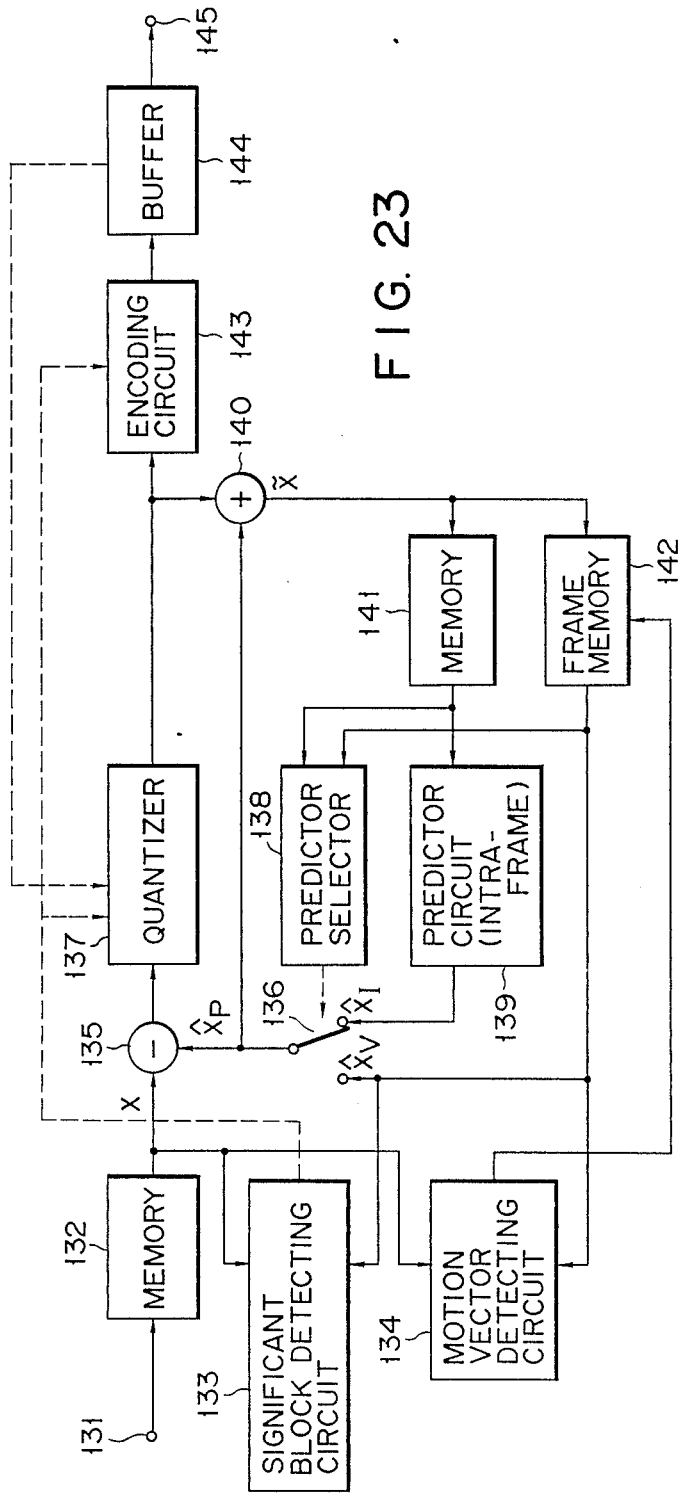
F I G. 23

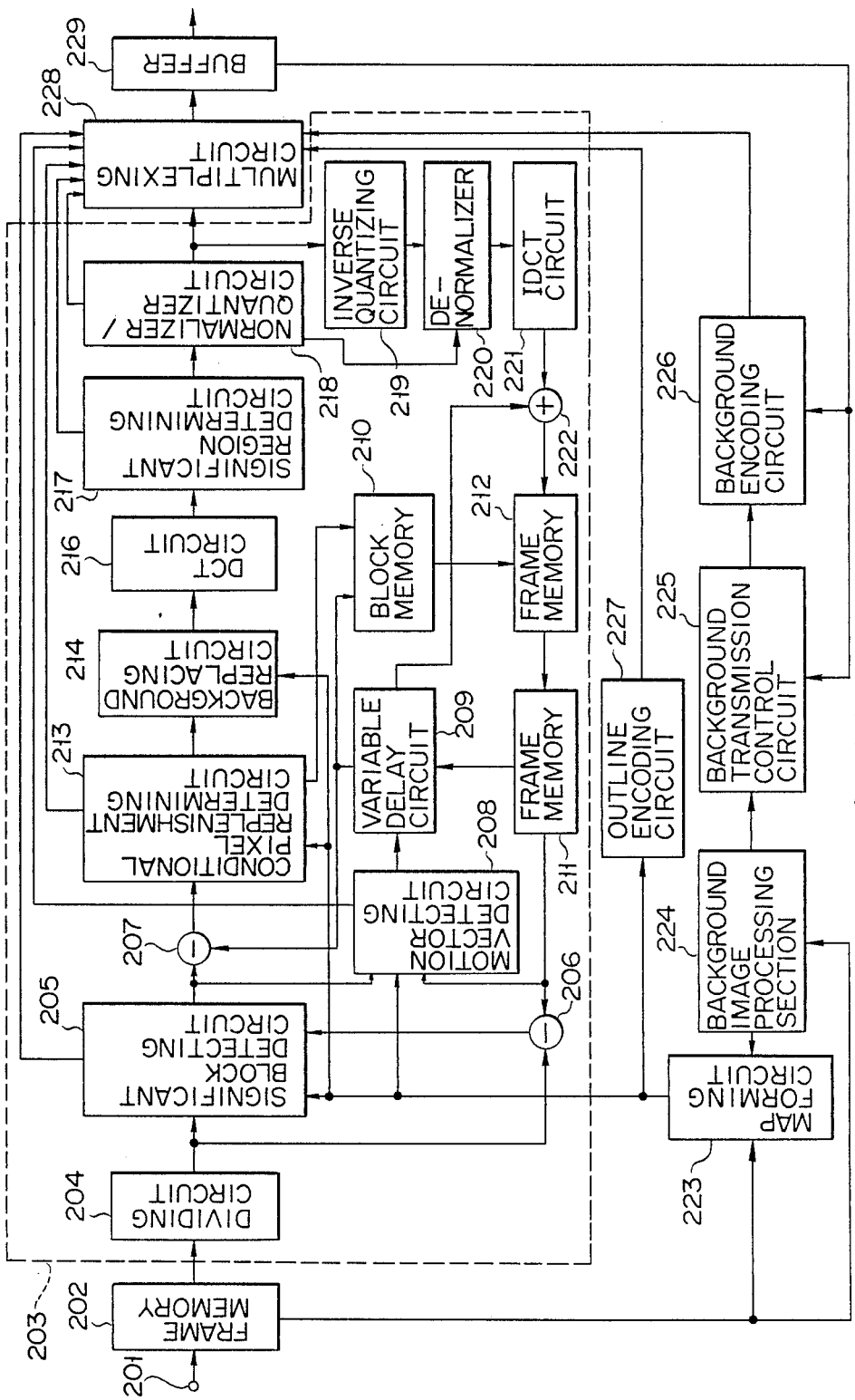
F I G. 24

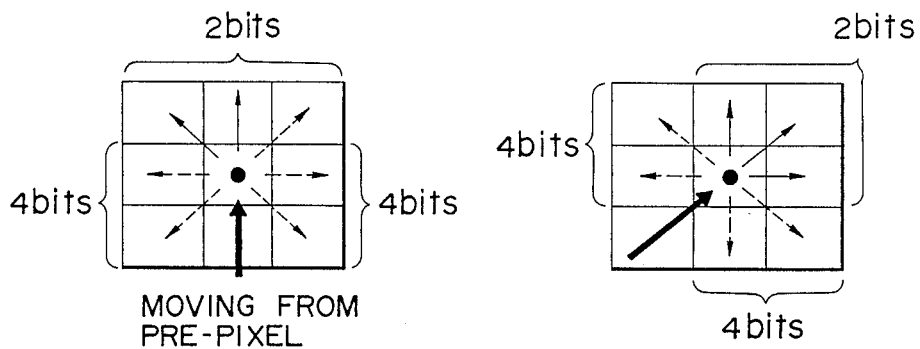
F I G. 25A  F I G. 25B
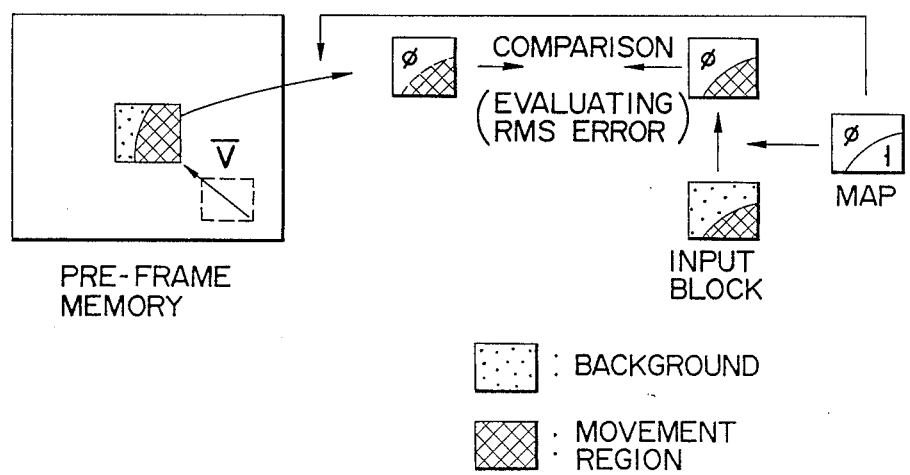
F I G. 26

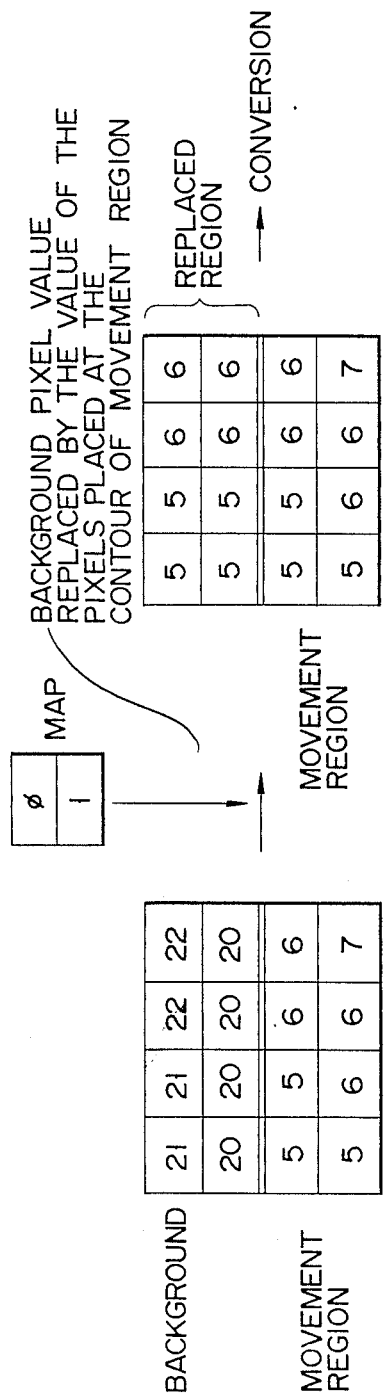
FIG. 27A
FIG. 27B
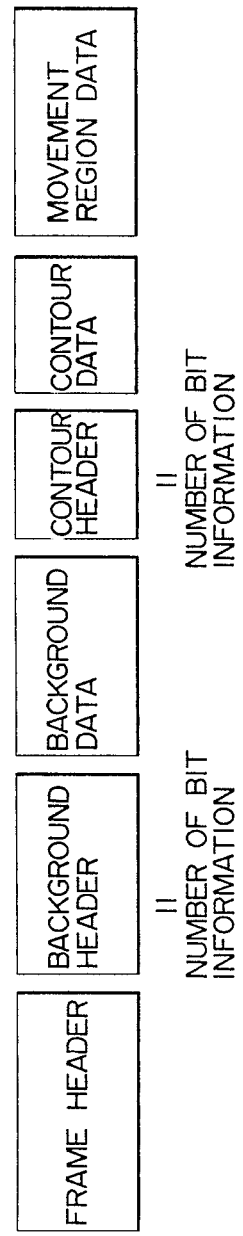
FIG. 28

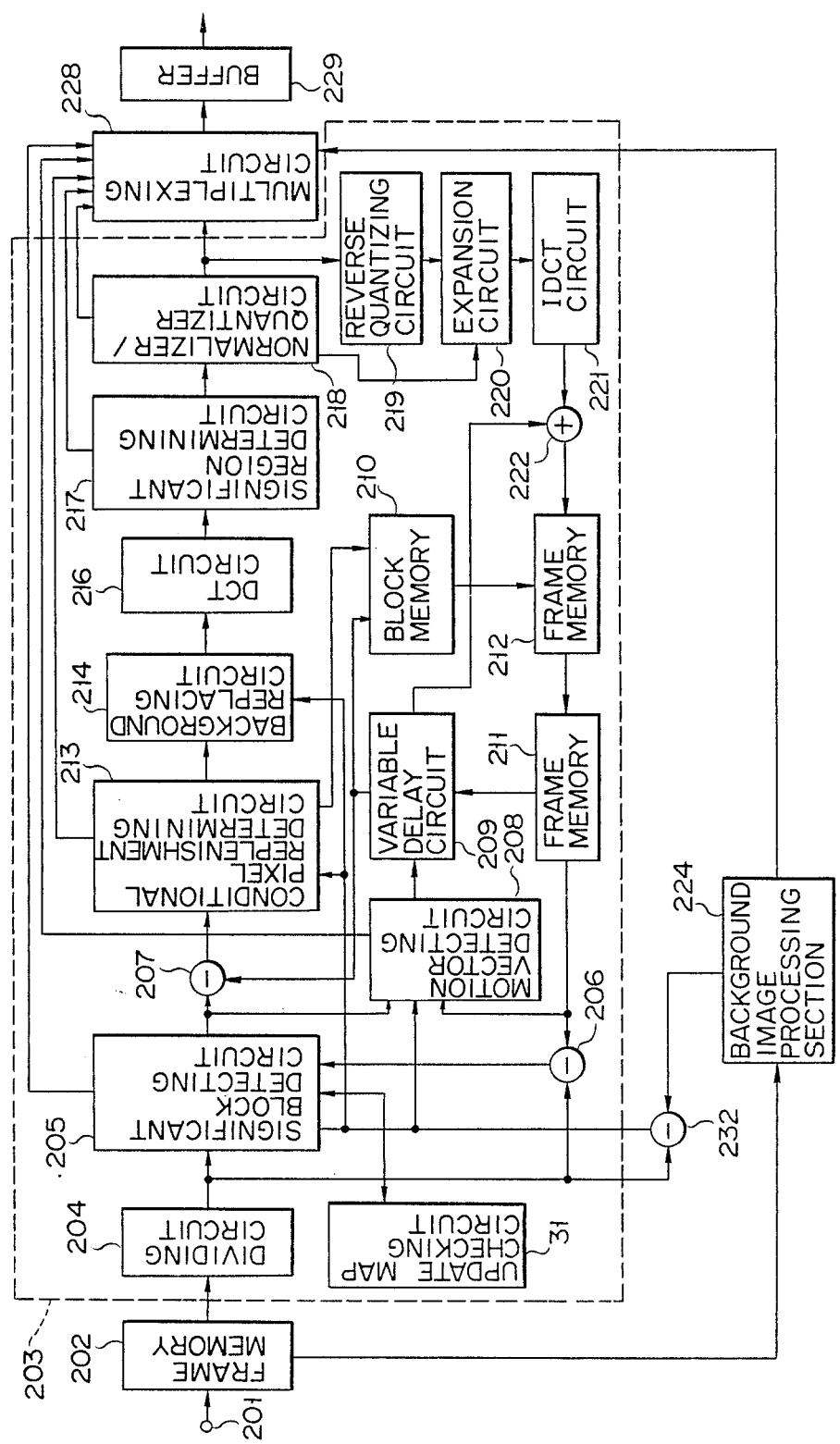
F I G. 30

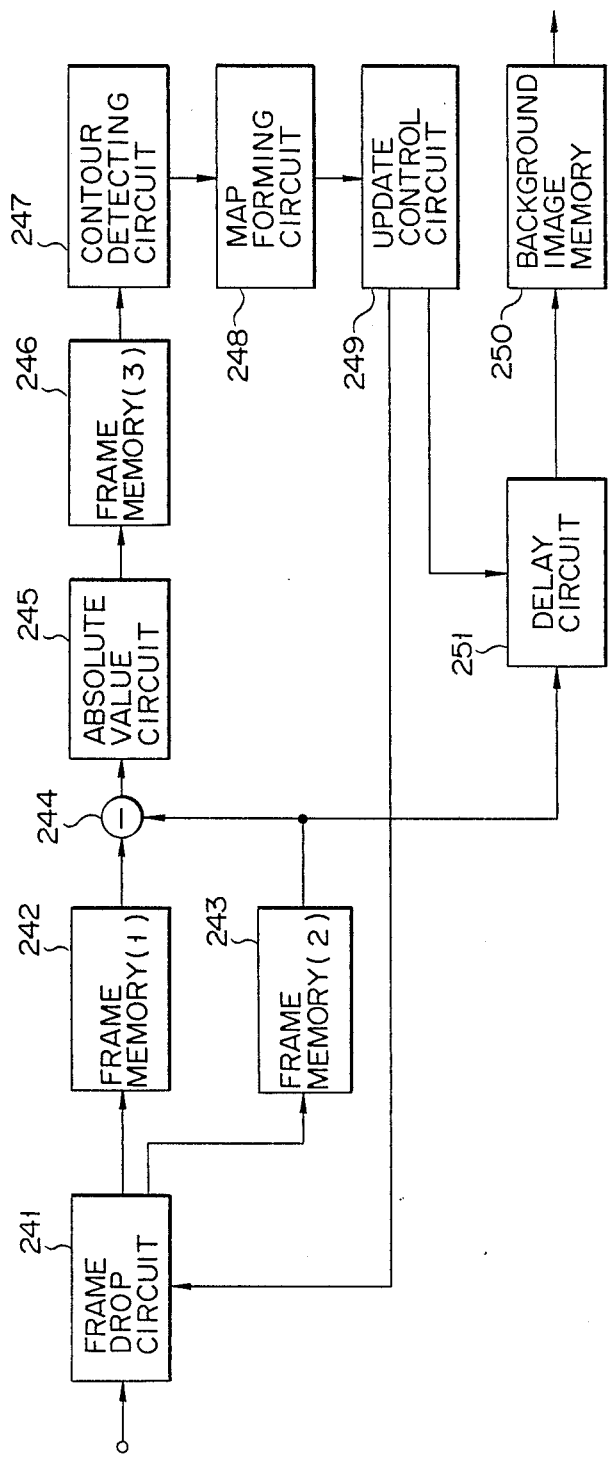
F I G. 31

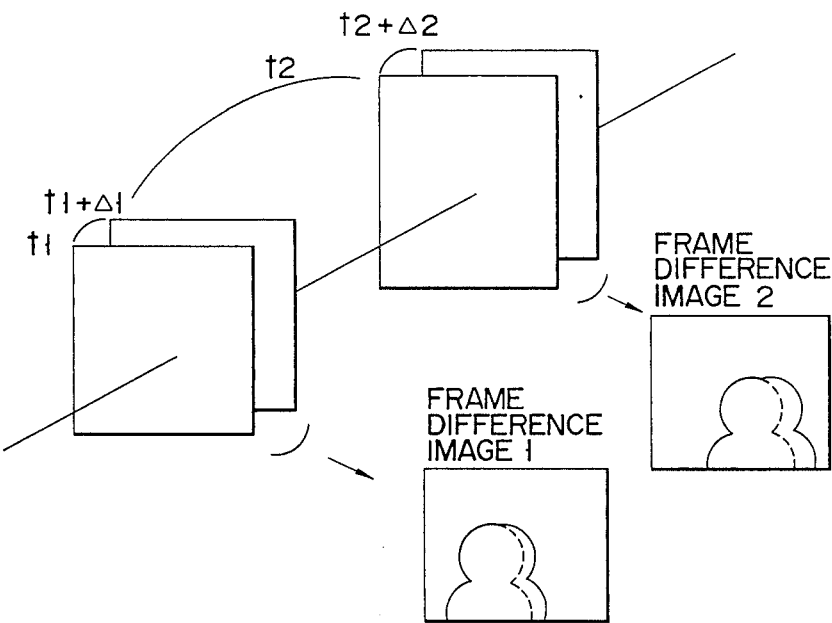
F I G. 35
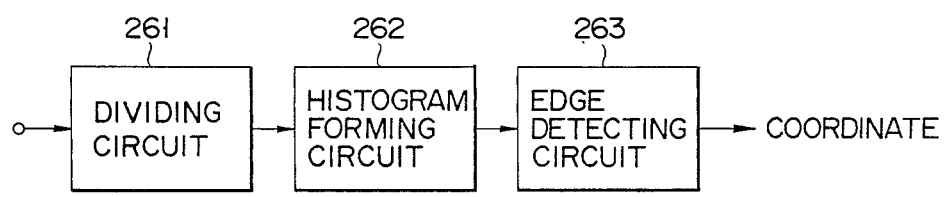
F I G. 36

MINIMUM VALUE
OF OUTLINE EDGE
VERTICAL SEARCH

HORIZONTAL
SEARCH

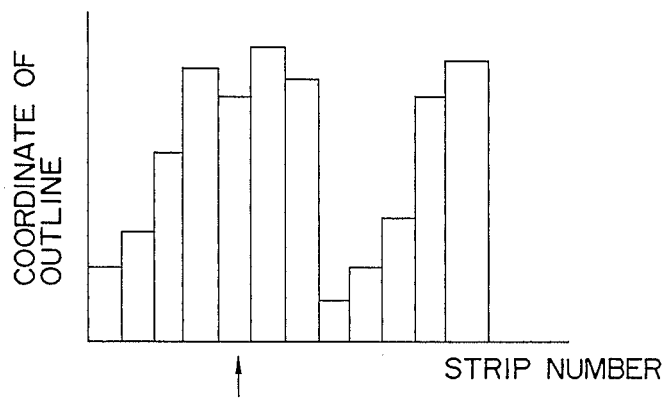
F I G. 39
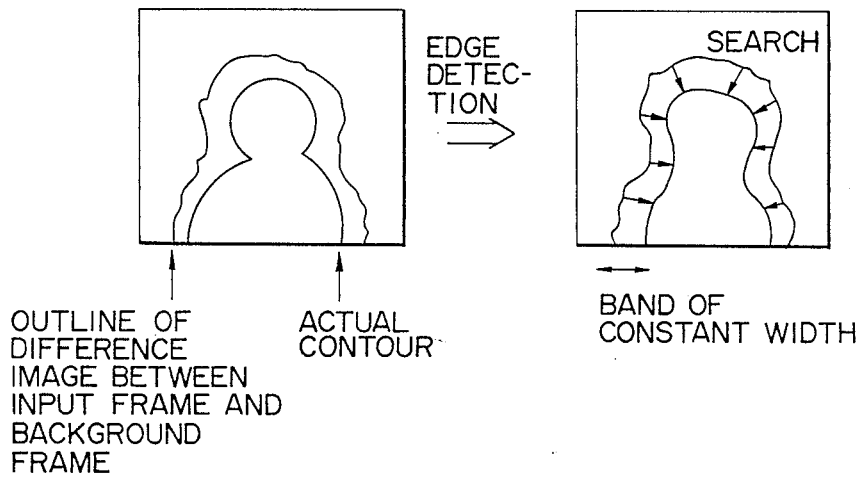
F I G. 41A  F I G. 41B

F I G. 40A
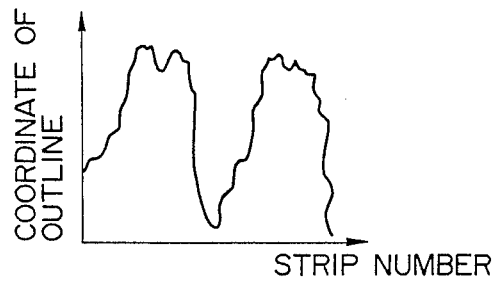
(LOW PASS FILTER)
F I G. 40B
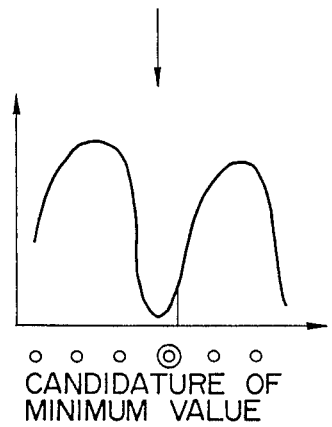
F I G. 40C
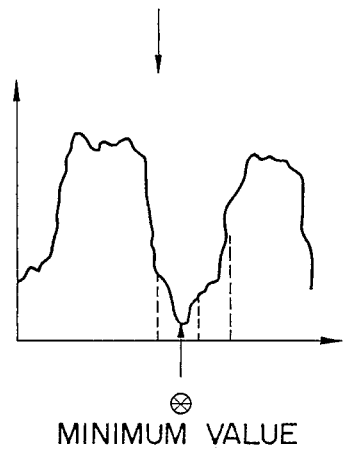

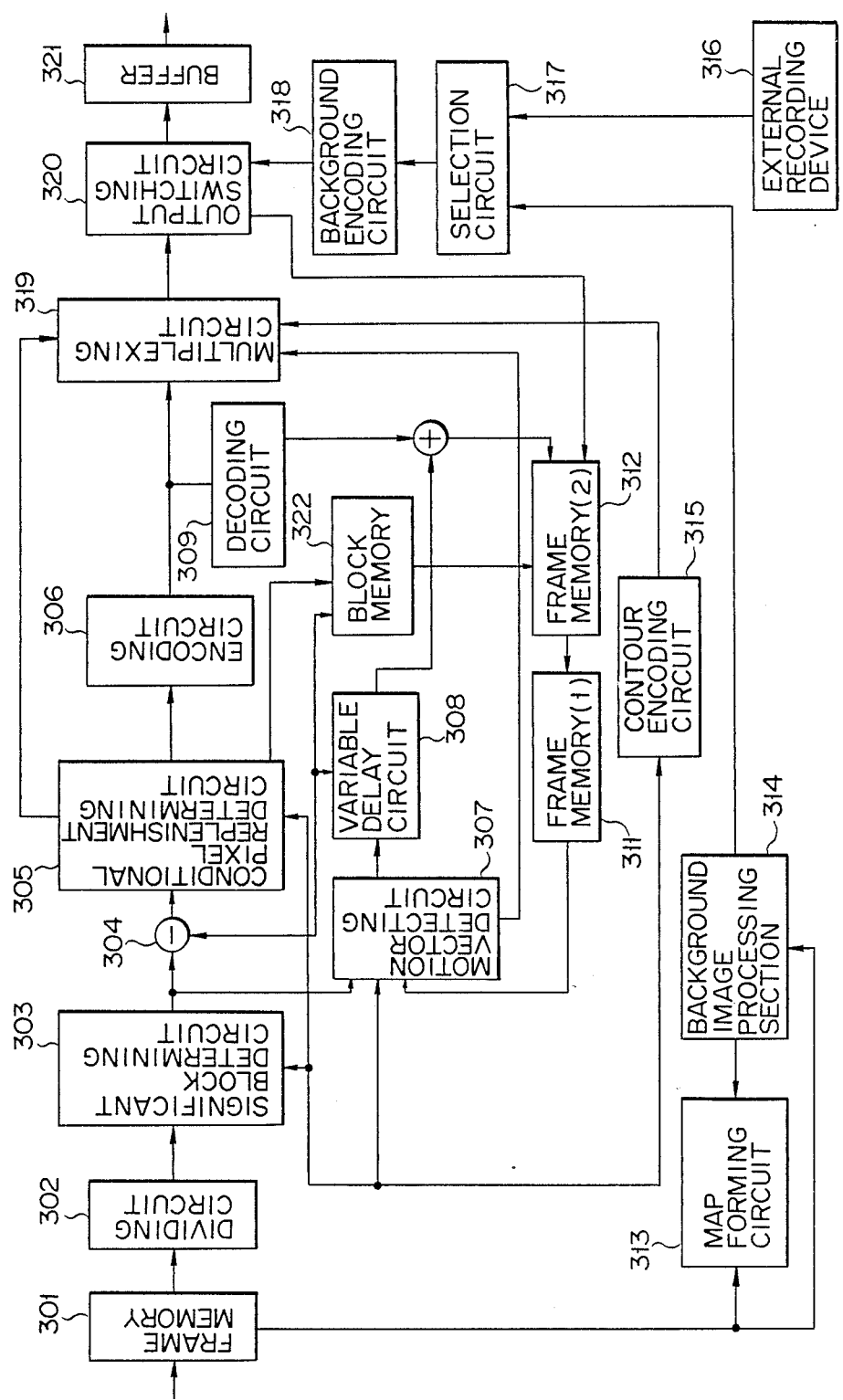
F I G. 43

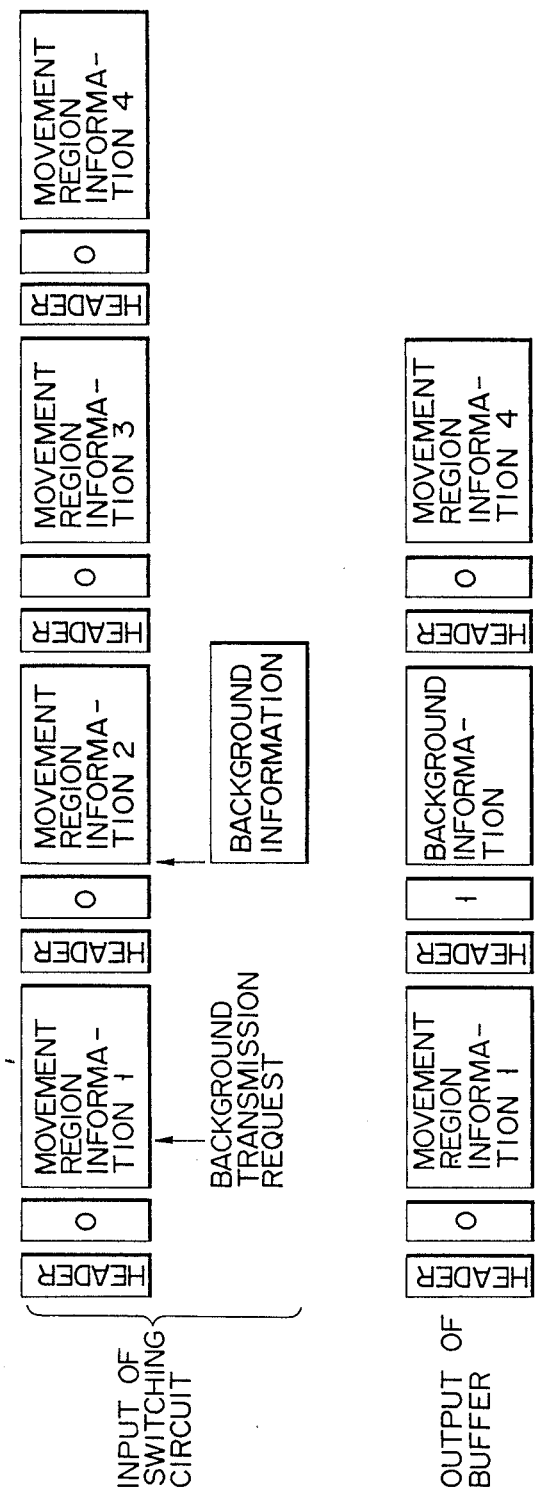
F I G. 44

00 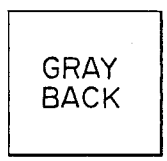 GRAY BACK
01  BLUE BACK
10 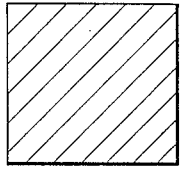 WHITE & BLACK STRIPE
11
BACKGROUND
CODE
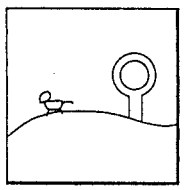 LANDSCAPE
BACKGROUND
F I G. 48

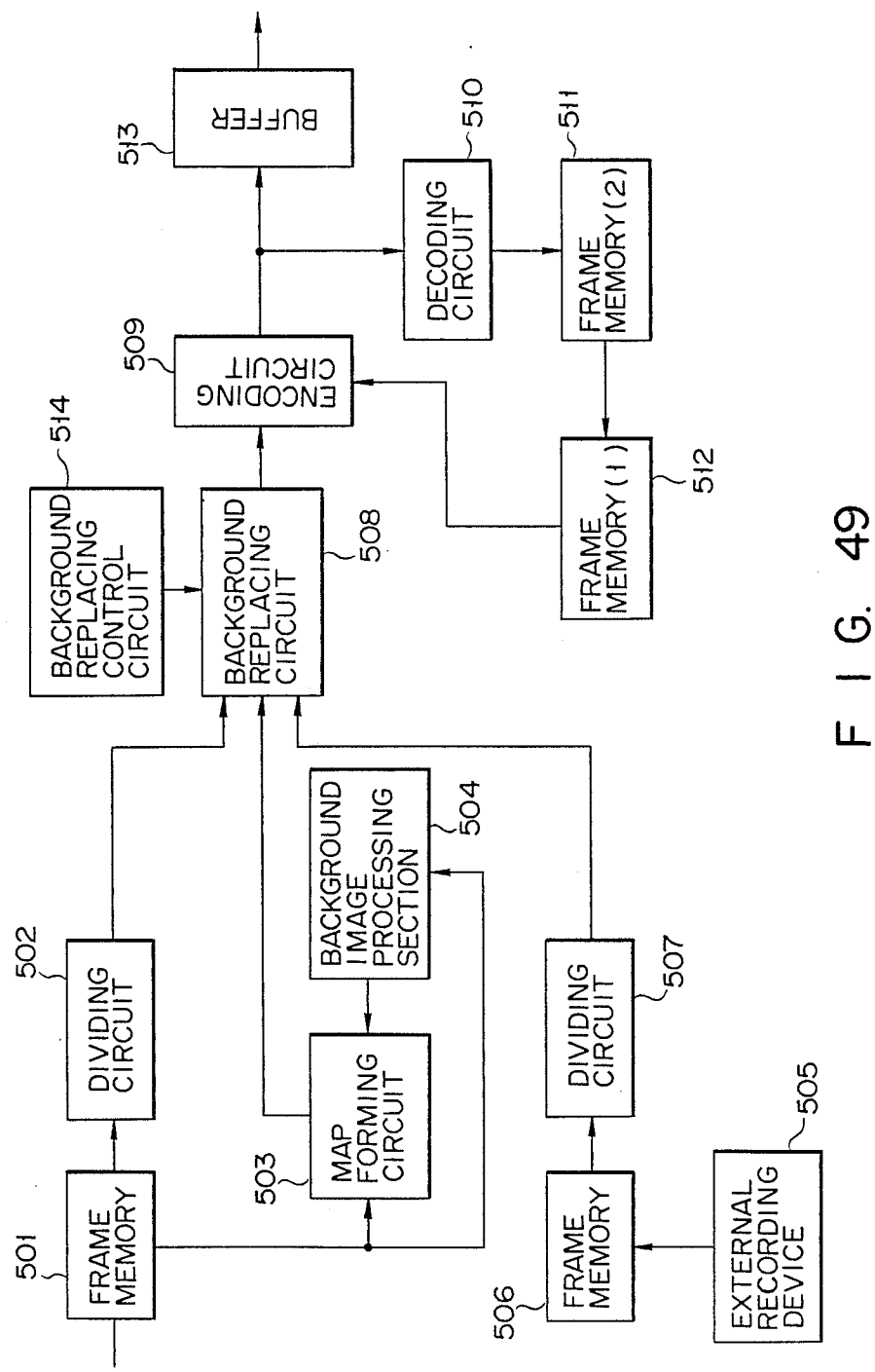
F I G. 49

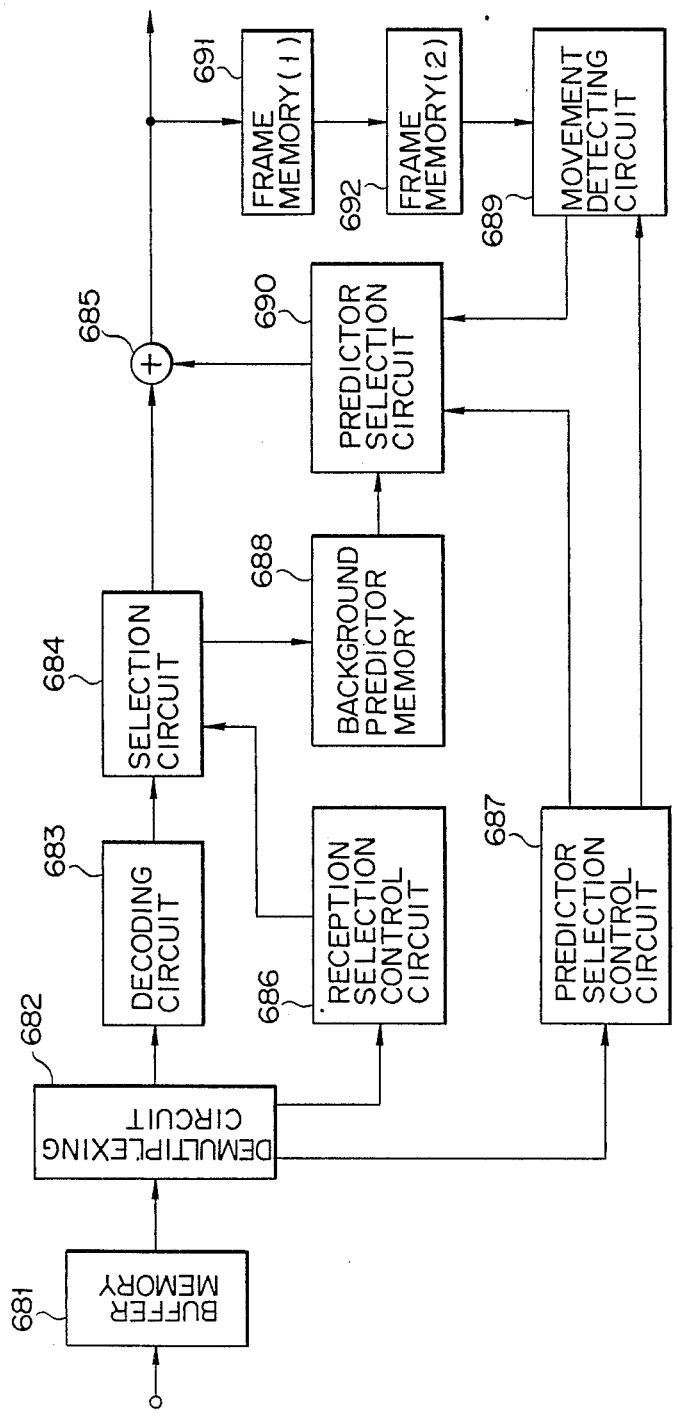
F I G. 51

IMAGE ENCODING APPARATUS

BACKGROUND OF THE INVENTION

1. Field of the Invention

The present invention relates to an image encoding apparatus for encoding a movement image used for a teleconference or video phone.

2. Description of the Related Art

Generally, in an apparatus for processing image information a data compression circuit is arranged to compress data in order to transfer a movement image having a very large data amount at a low bit rate. The data compression circuit may employ a system of performing different quantization or encoding operations for a still region and a movement region by utilizing the fact that the still portion of an image has a very high inter-frame or inter-field correlation. This system is disclosed in, e.g., Japanese Patent Disclosure (Kokai) No. 61-46685. In the system, input data is divided into a plurality of data blocks by a dividing circuit, and these data blocks are compared with those of an image stored in a frame memory. Thus, a movement of an image is detected by a motion vector detecting circuit. Data blocks of an immediately preceding image are read out from the frame memory, and are input to a variable delay circuit. The variable delay circuit selects one data block from the frame memory which corresponds to motion vector data output from the motion vector detecting circuit. Difference between the data blocks output from the variable delay circuit and input data block is calculated. A movement region detecting circuit discriminates, based on the differential data and the motion vector data, whether or not the input blocks include a movement region.

The differential data is quantized by a quantizer, and is input to a selection circuit. The selection circuit selects one output of the quantizer in accordance with an output from the motion vector detecting circuit. The selected quantized output is input to a variable-length encoder and a local decoder. The variable-length encoder multiplexes the selected quantized output and the motion vector data from the motion vector detecting circuit and outputs multiplexed data. The frame memory is rewritten by the decoded output from the local decoder.

In the system described above, since only a change in inter-frame or inter-field luminance is used for motion vector detection, a man's face, shoulder, chest, background, and the like are equally processed. however, in an actual communication utilizing a moving image, significant data is concentrated on a man's face, in particular, his or her eyes and mouth. If such significant data is equalized with insignificant data, a resultant image is displayed as a stiff image.

SUMMARY OF THE INVENTION

It is an object of the present invention to provide a movement image encoding system capable of transferring image data, which is natural and easy to see, with a small data amount.

According to the present invention, a movement or transition region is detected based on an inter-frame or inter-field difference, and only the transition region is transferred. A region surrounding a face (or eyes or mouth) is limited as a region narrower than the transition region, and bits more than those for regions other than the face region are allocated to the face region.

According to the invention, there is provided, an image encoding apparatus comprising memory for storing image data corresponding to an object having a specific portion, a specific image extracting circuit for outputting differential data corresponding to a difference between input image data and preceding image data, and extracting specific image data corresponding to the specific portion from the image data on the basis of the differential data, a buffer for matching a generated data amount with an output data amount, an encoding circuit for encoding the differential data and outputting encoded data, a parameter generating circuit for generating a quantization parameter according to at least one of the differential data and a remaining amount of the buffer, a quantizer for quantizing the encoded data output from the encoding circuit in accordance with the quantization parameter so as to allocate more bits to the specific image data than those to the remaining image data, and outputting quantized data, and an output circuit for converting the quantized data to output data and outputting the output data to the buffer.

BRIEF DESCRIPTION OF THE DRAWINGS

FIG. 2 is a block diagram showing a region extracting circuit used in the apparatus shown in FIG. 1;

FIGS. 13A and 13B are views for explaining an operation of the apparatus shown in FIG. 12;

FIG. 15 is a view for explaining the operation of the apparatus shown in FIG. 14;

FIG. 16 is a block diagram of an image encoding apparatus according to still another embodiment of the present invention;

FIG. 17 is a view for explaining the operation of the apparatus shown in FIG. 16;

FIG. 18 is a block diagram of an quantizing circuit;

FIG. 19 is a graph showing quantization characteristics of the quantizing circuit;

FIG. 20 is a graph showing input/output characteristics of the quantizing circuit;

FIGS. 21A to 21D and FIG. 22 are views for explaining a method of calculating a predictor;

FIG. 23 a block diagram of an image encoding apparatus according to still another embodiment of the present invention;

FIG. 24 is a block diagram of an image encoding apparatus according to still another embodiment of the present invention;

FIGS. 25 to 28 are views for explaining an encoding method of the image encoding apparatus shown in FIG. 24;

FIG. 30 is a block diagram of an image encoding apparatus as a modification of FIG. 29;

FIG. 31 is a block diagram of a background image processing section;

FIGS. 32 to 35 are views for explaining an operation of the background image processing section shown in FIG. 31;

FIG. 36 is a block diagram of a contour detecting circuit shown in FIG. 31;

FIGS. 39 and 40A–40C are views for explaining a method of searching a minimum value in the contour detection method shown in FIG. 38;

FIG. 41 is a view for explaining separation of a background region and a movement region performed by a map forming circuit;

FIG. 43 is a block diagram of a receiving section according to another embodiment;

FIG. 44 is a view showing a format of background data request data and transmission data;

FIG. 48 is a view showing the relationship between a background image and a background code;

FIG. 49 is a block diagram of a transmitting section of an image encoding apparatus according to still another embodiment;

FIG. 51 is a block diagram of a receiving section corresponding to the transmitting section of the image encoding apparatus shown in FIG. 50.

DETAILED DESCRIPTION OF THE PREFERRED EMBODIMENTS

Figure 1:
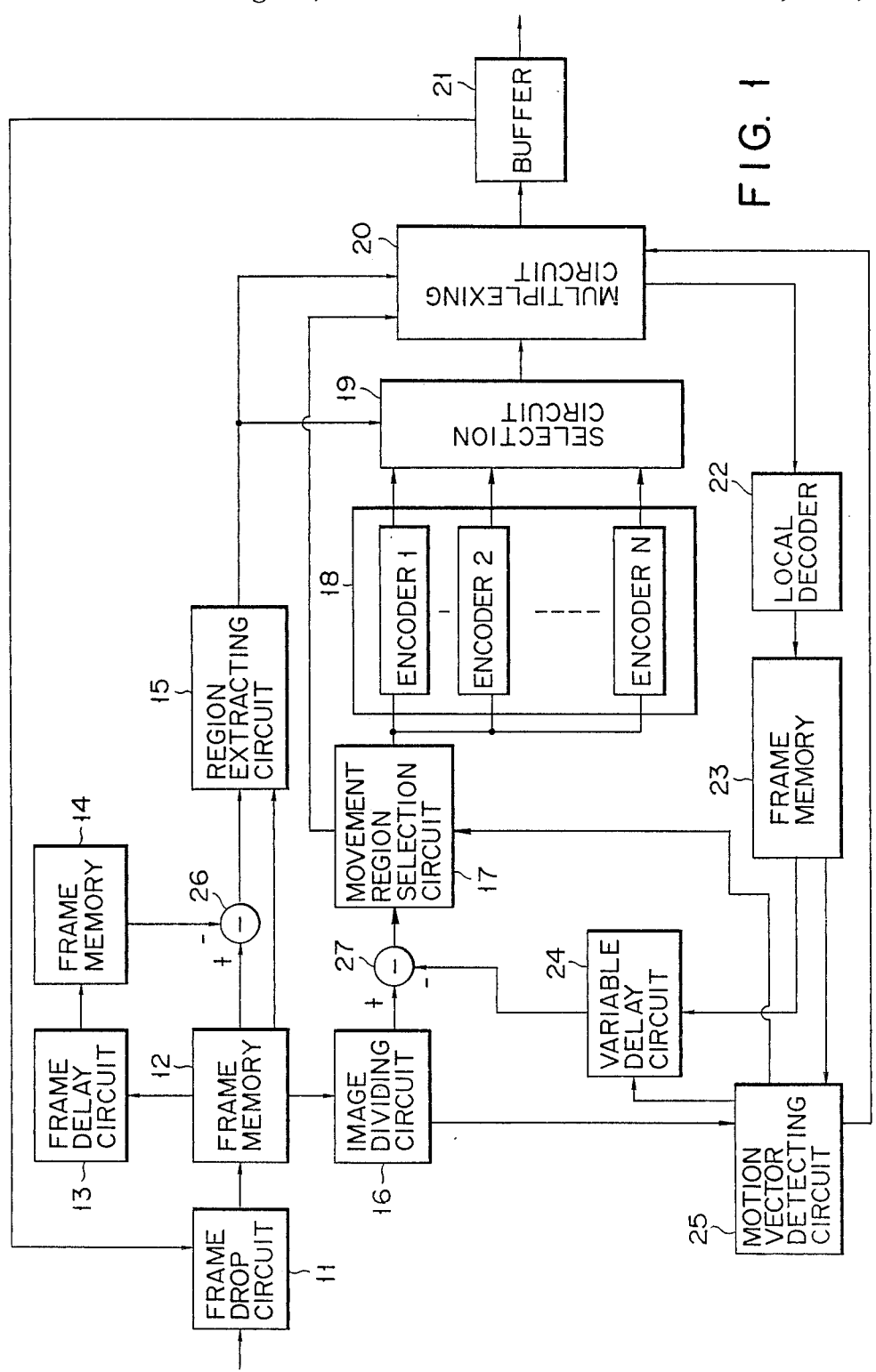
FIG. 1 is a block diagram of a movement image encoding apparatus according to the present invention.

According to an embodiment shown in FIG. 1, a frame dropo circuit 11 is arranged to limit image data supplied from, e.g., a TV camera. The output terminal of the frame drop circuit 11 is connected to the write terminal of a frame memory 12 for storing image data. The readout terminal of the frame memory 12 is connected to a frame memory 14 through a frame delay circuit 13. The frame delay circuit 13 delays frame image data read out from the frame memory by a time corresponding to an inter-frame interval, and the frame memory 14 stores the delayed frame image data.

The readout terminals of the frame memories 12 and 14 are connected to a subtracter 26. The output terminal of the subtracter and the readout terminal of the frame memory 12 are connected to a region extracting circuit 15. The subtracter 26 calculates a difference between the frame image data stored in the frame memories 12 and 14, and the region extracting circuit 15 extracts a face, eye, or mouth region from the differential data.

The readout terminal of the frame memory 12 is connected to a dividing circuit 16 for dividing image data stored in the frame memory 12 into a plurality of blocks The output terminal of the dividing circuit 16 is connected, through a subtracter 27, to a movement region selection circuit 17 for discriminating a movement region of an image. The output terminal of the movement region selection circuit 17 is connected to an encoding circuit 18 having a plurality of encoders 1 to N. The encoding circuit 18 is connected to a multiplexing circuit 20 through a selection circuit 19 for selecting, on the basis of the region extracted by the circuit 15, one output of the encoders 1 to N to which different numbers of bits are allocated. The input terminal of the multiplexing circuit 20 is connected to the region extracting circuit 15, the movement region selection circuit 17, and a motion vector detecting circuit 25. The multiplexing circuit 20 multiplexes the outputs from these circuits with the output from the encoding circuit 18. The output terminal of the multiplexing circuit 20 is connected to a buffer 21 and a local decoder 22 The output from the buffer 21 is transferred to an external circuit, and is supplied to the frame drop circuit 11 so as to control a frame drop operation. The local decoder 22 is connected to a frame memory 23, and decodes multiplexed data output from the multiplexing circuit 20. The decoder 22 writes the decoded data in the frame memory 23. The readout terminal of the frame memory 23 is connected to a variable delay circuit 24 and the motion vector detecting circuit 25 The motion vector detecting circuit 25 compares the data blocks output from the dividing circuit 16 and the data blocks of the immediately preceding image stored in the frame memory 23 so as to detect a motion vector of an image, and outputs motion vector data. The output terminal of the motion vector detecting circuit 25 is connected to the multiplexing circuit 20 and the variable delay circuit 24, and supplies the motion vector data to these circuits. The delay amount of the variable delay circuit 24 is changed in accordance with the motion vector data. The circuit 24 selects a data block corresponding to the delay amount from the frame memory 23. The output terminal of the variable delay circuit 24 is connected to the subtracter 27.

The region extracting circuit 15 is arranged as shown in FIG. 2. Referring to FIG. 2, Y- and X-axis histogram forming circuits 31 and 35 receive the differential data output from the subtracter 26, and form Y- and X-axis histograms on the basis of the differential data. The Y- and X-axis histogram forming circuits 31 and 35 are connected to mean value circuits 32 and 36, respectively. The mean value circuits 32 and 36 calculate mean values of the Y- and X-axis histograms, respectively. The output terminals of the mean value circuits 32 and 36 are connected to comparators 33 and 37, respectively. The comparators 33 and 37 compare the mean values calculated by the mean value circuits 32 and 36 with the histograms output from the histogram forming circuits 31 and 35, respectively. The output terminals of the comparators 33 and 37 are connected to transition point detecting circuits 34 and 38 for detecting coordinates of points of transition of the histograms, respectively. The output from the transition point detecting circuit 34 corresponding to the Y axis is supplied to the X-axis histogram forming circuit 35 so as to set a forming range of the histogram.

The operation of this embodiment will be described below with reference to FIGS. 1 and 2.

When image data supplied from the TV camera is input to the frame drop circuit 11, the frame drop circuit 11 selects frame (or field) image data, and stores the selected data in the frame memory 12. The frame image data read out from the frame memory 12 is delayed by the frame delay circuit 13 by a predetermined period of time, e.g., inter-frame interval and the delayed data is stored in the frame memory 14. The frame image data input from the frame memory 12 to the dividing circuit 16 is divided into a plurality of data blocks, and each data block is supplied to the motion vector detecting circuit 25. The movement detecting circuit 25 compares the data block output from the dividing circuit 16 with the preceding data block read out of the frame memory 23, to output vector data representing a amount of movement and the direction thereof. The vector data is input to the variable delay circuit 24, to delay the data block read out of the frame memory 23 by the time corresponding to the vector data. The subtracter 27 is supplied with the delayed data block and the input data block output from the dividing circuit 16, to obtain difference data corresponding to the difference therebetween, since the data block delayed according to the vector data is not coincident with the corresponding input data block when the amount of movement exceeds a value determined by the detection accuracy of the movement detecting circuit. When the difference data is supplied to the movement region selection circuit 17, the data block corresponding to the difference data is selected thereby, and supplied to the encoding circuit 18. The encoders 1-N included in the encoding circuit 18 encode the selected data block in accordance with the respective numbers of bits. For example, the encoder 3 encodes the data of an input data block which is constructed by 8 bits to data constructed by 6 bits.

Figure 3B:
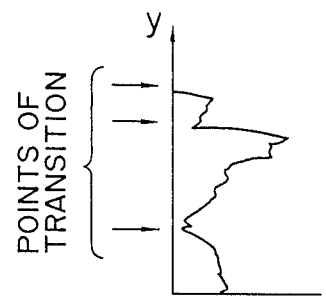
FIGS. 3a-3c are views for explaining an operation of the region extracting circuit shown in FIG. 2.
Figure 3A:
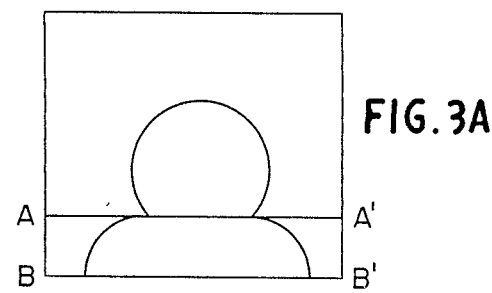
Figure 3C:
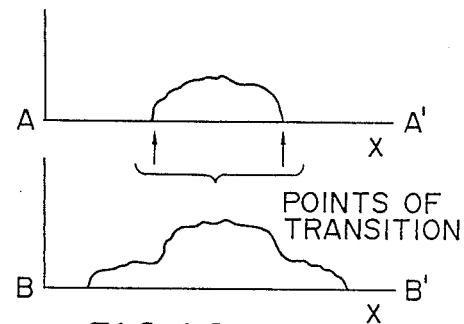

The subtracter 26 calculates a difference between present frame image data stored in the frame memory 12 and the immediately preceding frame image data stored in the frame memory 14, and outputs data representing the difference (to be referred to as frame-differential data hereinafter) to the region extracting circuit 15. The region extracting circuit 15 extracts a region including a feature portion such as a face, eyes, mouth, and the like on the basis of the frame-differential data. In this case, as shown in FIG. 3a–3c, X- and Y-axis histograms are formed on the basis of an image corresponding to the frame-differential data, and coordinates of points of transition of these histograms are extracted. When the X-axis histogram is formed, since a large amount of frame-differential data are generated from a region such as a shoulder, as represented by a histogram above a line B—B, a region in the longitudinal direction of an image is limited by points of transition of the Y-axis histogram. In this limited region, the X-axis histogram is formed.

Thus, an X-axis histogram above a line A—A can be obtained. A feature region such as a face, eyes, mouth, or the like can be extracted on the basis of the coordinates of the points of transition of the Y- and X-axis histograms.

The region extracting operation will be described with reference to the region extracting circuit shown in FIG. 2 and the histogram forming circuit shown in FIG. 4.

Figure 4:
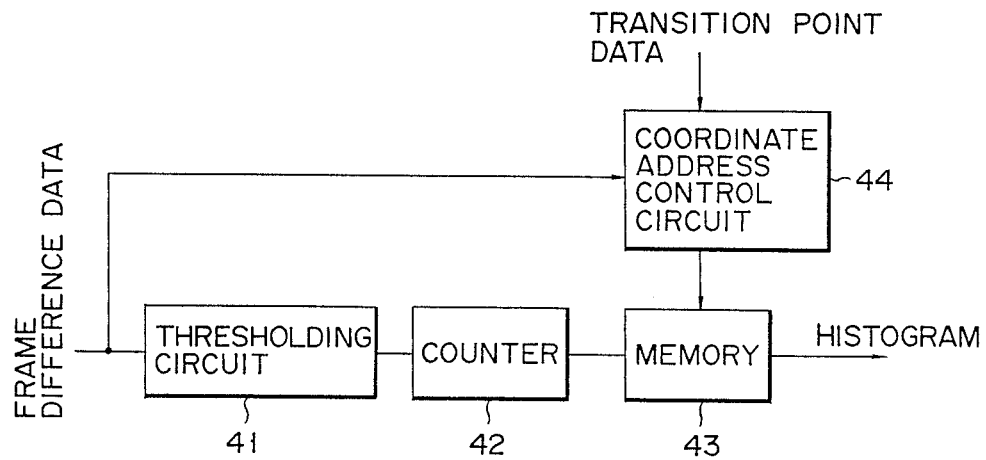
FIG. 4 is a block diagram of a histogram forming circuit used in FIG. 2.

Each of the Y- and X-axis histogram forming circuits 31 and 35 is arranged as shown in FIG. 4. When frame-differential data is input to the Y- and X-axis histogram forming circuits 31 and 35, the Y-axis histogram forming circuit 31 forms the Y-axis histogram. In this case, for example, 8-bit differential data output from the subtracter 26 is converted to 1-bit data by a thresholding circuit 41. The 1-bit data are counted by a counter 42, and the count result is stored in a memory 3. In this case, the differential data is also supplied to a coordinate address control circuit 44. The coordinate address control circuit 44 outputs a coordinate address corresponding to the input differential data to the memory 43. Therefore, the memory 43 stores the count value at the address corresponding to the input differential data. In this manner, the Y-axis histogram shown in FIG. 3 is formed in the memory 43. The mean value of the Y-axis histogram read out from the memory 43 is calculated by the mean value circuit 32, thus obtaining a Y-axis mean value. The Y-axis mean value is compared with the Y-axis histogram by the comparator 33. The transition point detecting circuit 34 detects the coordinates of points of transition of the Y-axis histogram on the basis of the comparison result data. When the Y-axis transition point coordinate data is input to the X-axis histogram forming circuit 35, the circuit 35 forms the X-axis histogram based on the differential data above the line A—A in the same manner as in the Y-axis histogram forming circuit 31. The mean value of the X-axis histogram is calculated by the mean value circuit 36, thus obtaining an X-axis mean value. The X-axis mean value is compared with the X-axis histogram by the comparator 37. The transition point detecting circuit 38 detects coordinates of points of transition of the X-axis histogram on the basis of the comparison result data.

When the Y- and X-axis transition point coordinate data obtained as described above are input to the selection circuit 19, the selection circuit 19 selects one encoder corresponding to the coordinate data, and supplies data stored in the selected encoder to the multiplexing circuit 20. More specifically, image data of a region limited by the coordinate data is supplied to the multiplexing circuit 20, and is multiplexed with the motion vector data, the movement region data, and the coordinate data. The multiplexed data is output to an external circuit through the buffer 21, and updates the frame memory 23 through the local decoder 22.

Figure 5B:
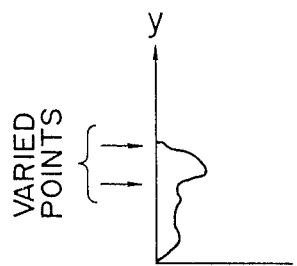
FIGS. 5a-5c are views for explaining an operation of extracting a region including a plurality of persons.
Figure 5A:
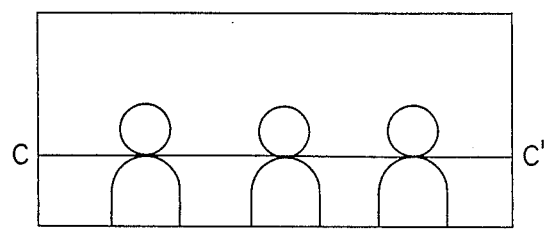
Figure 5C:
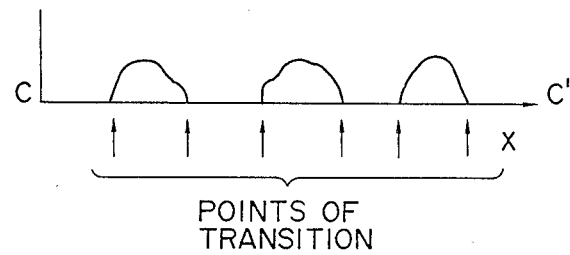
Figure 6:
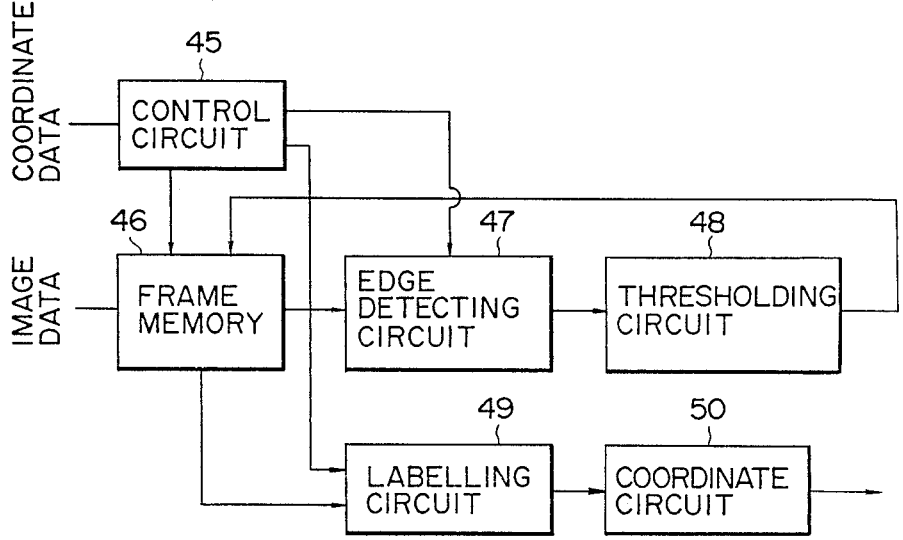
FIG. 6 is a block diagram of a region extracting circuit according to a modification.

In the above embodiment, an image of one person is encoded. The present invention can also be applied to a case wherein images of a plurality of persons are encoded, as shown in FIG. 5a–5c.

When eye or mouth image data is extracted, coordinate data corresponding to a face output from the region extracting circuit 15 is input to a control circuit 45, and frame image data read out from the frame memory 12 is input to and stored in a frame memory 46. The control circuit 45 limits a processing range of the frame image data stored in the frame memory 46 in accordance with the input coordinate data. The limited image data in the frame memory 46 is input to an edge detecting circuit 47, and an edge of the limited image data is detected. The edge data is converted to binary data by a converting circuit 48, and is rewritten in the frame memory 46. A labeling circuit 49 selects 8-conectivity data from the image data stored in the frame memory 46, and combines and labels these image data. A coordinate detecting circuit 50 detects coordinates of each vertex of a rectangle including a region provided with the same label, and outputs its coordinate data. The coordinate data is input to the selection circuit 19, so that image data corresponding to a part of a face, e.g., eyes, a mouth, or the like can be extracted.

As described above, the movement region is detected based on the frame-differential data, an important feature portion, i.e., a face, eyes, or mouth is detected from the movement region, and a larger number of bits are allocated to the feature portion. As a result, image data can be encoded so that a natural image which is easy to see can be reproduced.

Another embodiment will be described below with reference to FIG. 7.

Frame image data read out from a frame memory 51 is delayed by a predetermined period of time corresponding to a one-frame period by a frame delay circuit 63, and the delayed data is stored in a frame memory 64. More specifically, the frame memory 64 stores a frame image signal of the immediately preceding frame. The frame image data stored in the frame memories 51 and 64 are input to a face detecting circuit 65, and difference data therebetween is calculated. The differential data is input to a step size-determining circuit 66.

A subtracter 52 calculates a difference between a data block read out from the frame memory 51 and a data block selected from a frame memory 57 by a variable delay circuit 59, and outputs differential data. In this case, the variable delay circuit 59 selects the data block from the frame memory 57 in correspondence with the motion vector data from a motion vector detecting circuit 60. The differential data is subjected to DCT (Discrete Cosine Transform) processing by a DCT circuit 53, and the DCT data is supplied to a quantizing circuit 54. The quantizing circuit 54 quantizes the DCT data in accordance with an output signal from the step size-determining circuit 66 (to be described later). The quantized data is input to a multiplexing circuit 67, and is multiplexed with the motion vector data output from the motion vector detecting circuit 60 and the face detection data output from the face detecting circuit 65. The multiplexed data is output to an external circuit through a buffer 62.

The quantized data output from the quantizing circuit 54 is subjected to inverse DCT processing by an inverse DCT circuit 55, and the inverse DCT data is input to an adder 56. The adder 56 adds the inverse DCT data to a data block read out from a block memory 58. The output data from the adder 56 is written in the frame memory 57 as locally encoded data.

Figure 8:
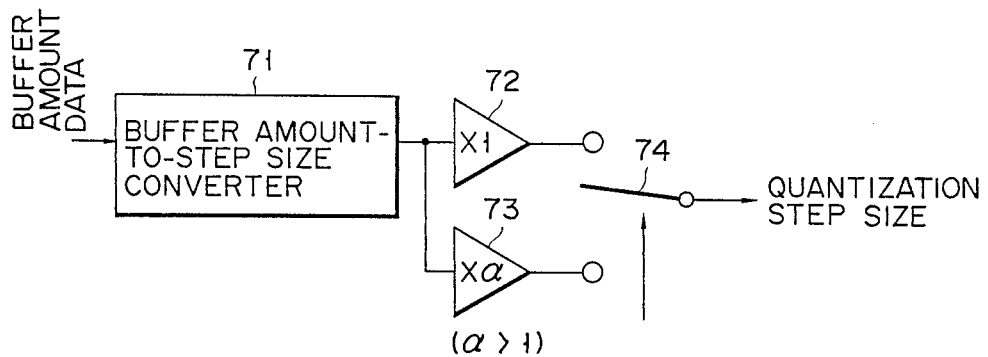
FIG. 8 is a block diagram of a step-size determining circuit used in the apparatus shown in FIG. 7.

The step size-determining circuit 66 determines a quantizing step size on the basis of buffer amount data from the buffer 62 and face detection data output from the face detecting circuit 65, and outputs the step size data to the quantizing circuit 54. In this case, as shown in FIG. 8, a buffer amount-to-step size converter 71 determines the step size on the basis of a predetermining corresponding relationship between the buffer amount and the step size. The step size data thus determined is input to a x1 (one multiplying) circuit 72 which multiplies the step size data with 1, to unchange the size of the step size data, and a xα (α multiplying) circuit 73 which multiplies the size of the step size data with α (α > 1). The outputs from these circuits 72 and 73 are switched by a switch 74. Upon switching, when the face detection result is 1 (face region), the output from the x1 circuit is selected. When the face detection result is 0 (region other than face), the output from the xα circuit 73 is selected. That is, in a region other than the face, a parameter is changed to degrade image quality. With this method, a data amount to be generated is decreased, and a buffer amount of the buffer 62 is decreased accordingly. Thus, a larger number of bits can be essentially allocated to the face region by data fed back from the buffer 62 in the next encoding step. In a frame, there are usually allocated more bits in a face region than in the other region, and when the region other than the face region, allocated with less bits, is subjected to the above bit processing, the amount of image data to be processed is reduced, so that a stabilized buffer control is realized.

The quantizing circuit 54 quantizes the DCT data on the basis of a new quantizing step size to decrease a data amount.

A face detection method performed by the face detecting circuit 65 will be described below.

Figure 9:
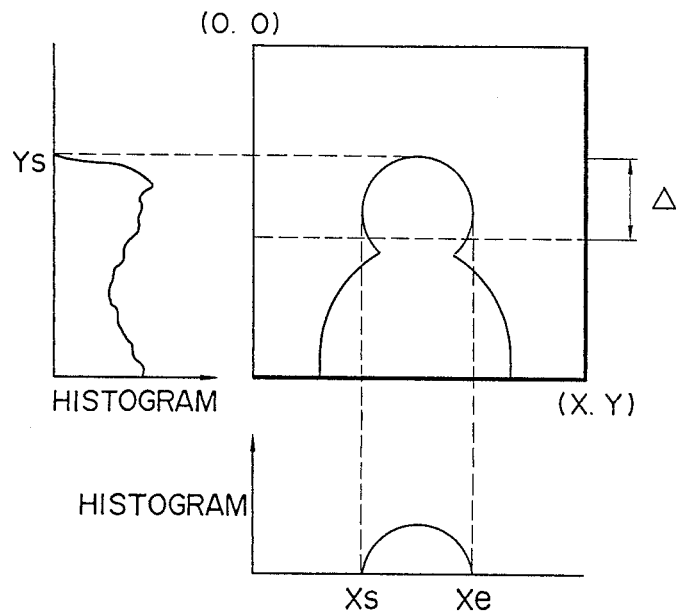
FIG. 9 is a view showing a difference image and a histogram.

FIG. 9 shows frame-difference image data formed by the face detecting circuit 65. The image data is binarized to data "1" or "0" by a predetermined first threshold value. The number of pixels corresponding to a value larger than the first threshold value, i e., 1 is counted in each of the horizontal and vertical directions, thus forming Y- and X-axis histograms. A face region is detected based on the histograms. In this case, the top of a head is detected first. The top of the head can be obtained by detecting a point Ys which is detected by detecting transition points of the Y-axis histogram and exceeds a predetermined second threshold value. The left and right ends of the head portion are then detected. In this case, in order to remove data corresponding to a region below a shoulder, data corresponding to a portion having a width Δ from the top of the head is utilized. In the X-axis histogram of the portion having the width Δ, points Xs and Xe of transition exceeding the second threshold value are detected. Note that the width Δ can be calculated by the following equation:

$$\Delta = (Y - Ys) \times \beta$$

for $\beta = \frac{1}{4}$ or 1/5

The lower end of the face region is then detected. The lower end of the face region is difficult to obtain based on the histogram. Thus, a predetermined ratio γ is multiplied with the head portion width to calculate a head portion length. The value γ is preferably 1.3 to 1.6.

Figure 10:
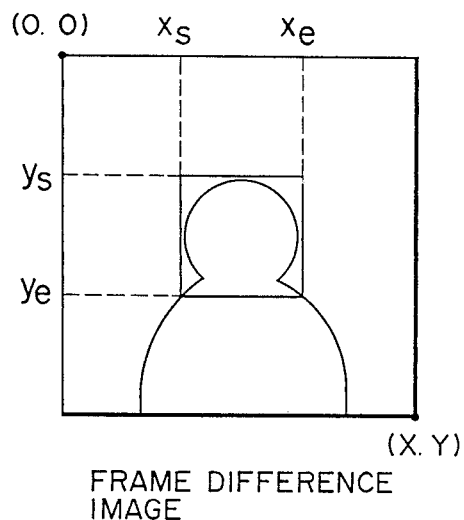
FIG. 10 is a view for explaining extraction of a face region.

With the above processing, as shown in FIG. 10, the face region is designated by a rectangle defined by coordinates Xs, Xe, Ys, and Ye. A larger number of bits can be distributed to a face region inside the rectangle.

Figure 11:
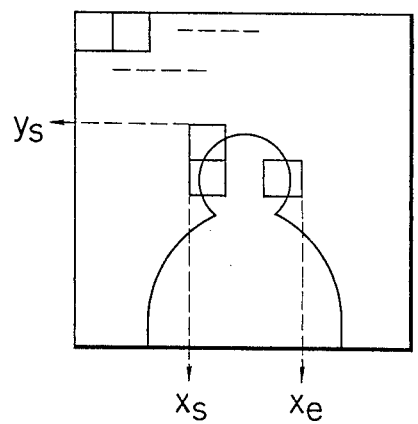
FIG. 11 is a view for explaining extraction of a face region according to another method.

FIG. 11 shows another method of detecting a face region. In the method shown in FIG. 9, the coordinates Xs, Xe, Ys, and Ye are calculated in units of pixels. In the method of FIG. 11, however, the face region is detected in units of blocks. In this case, frame-difference image data is divided into a plurality of blocks each having a predetermined size. The size of the block can be either equal to or smaller than that of an encoding block. The number of pixels exceeding the predetermined first threshold value in the block is counted. The count value of each block is sequentially compared with a second threshold value from the upper end portion of a frame, and a block exceeding the second threshold value first is detected as a block including the top of a head. The Y coordinate Ys of the top of the head is determined by this block. The count value of the block is compared with the second threshold value in the range of the width Δ from the top of the head represented by the coordinate Ys. Of blocks having the count values larger than the second threshold value, the coordinate of a block having the leftmost coordinate is determined as the left-end coordinate Xs of the face region, and the coordinate of a block having the rightmost coordinate is determined as the right-end coordinate Xe. The lower-end coordinate Ye of the face region is determined in the same manner as in the method shown in FIG. 9.

The face region data obtained by the method shown in FIG. 9 or 11 must be sent to a reception side as additional data. However, since data to be supplied basically are only three data Xs, Xe, and Ys, even if 8 bits are used per point, 24-bit additional data can be supplied per frame. When an encoding method such as a reference model of a standardizing method is employed, the resolution of a face region can correspond to a macro block size (corresponding to a 16×16 block in a luminance signal). Therefore, the number of patterns formed by a combination of Xs, Xe, and Ys is 22×22×18=8,712, and 13-bit additional data can be added per frame.

Figure 12:
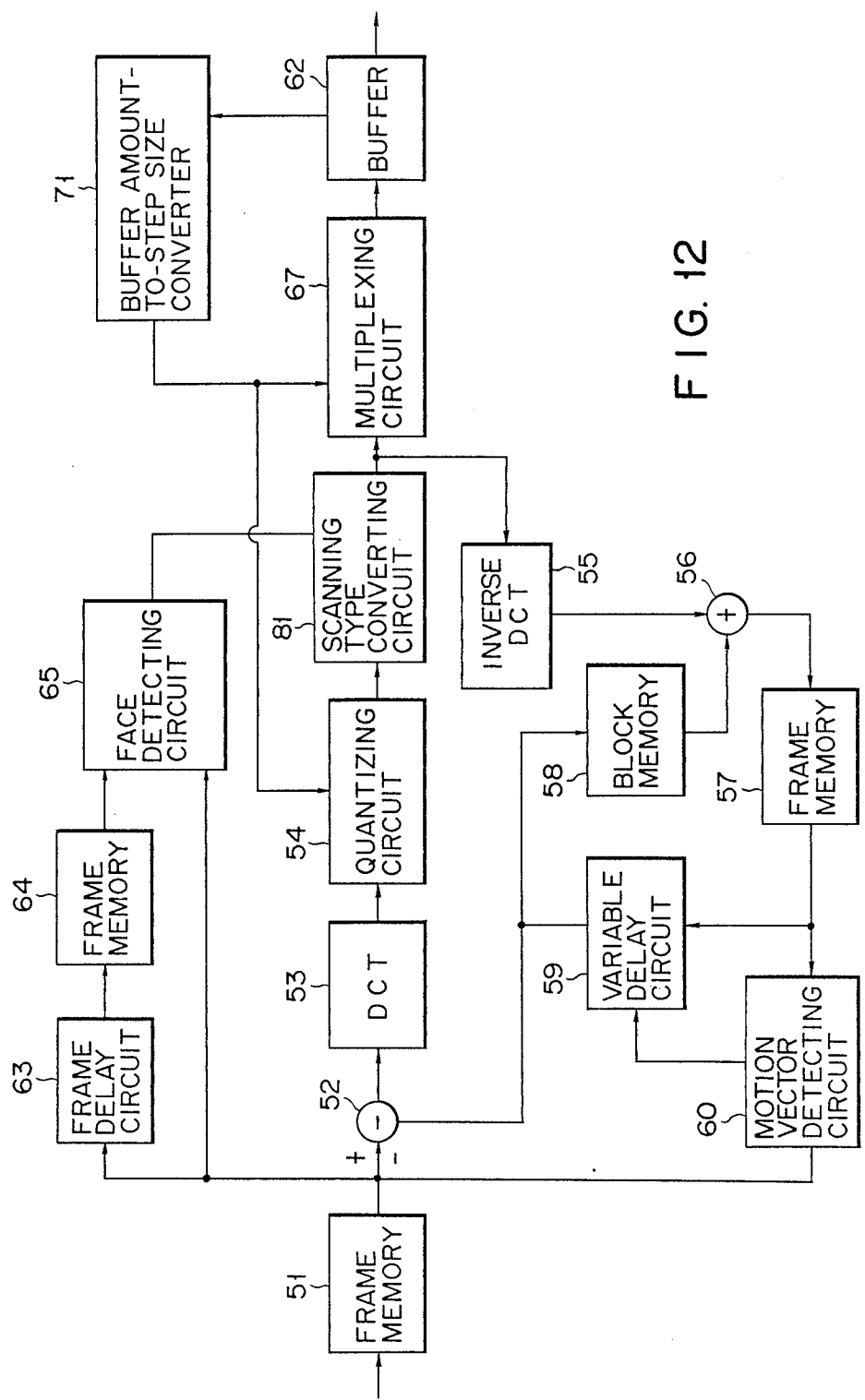
FIG. 12 is a block diagram of an image encoding apparatus according to still another embodiment of the present invention.

Still another embodiment of the present invention will be described below with reference to FIG. 12.

Figure 7:
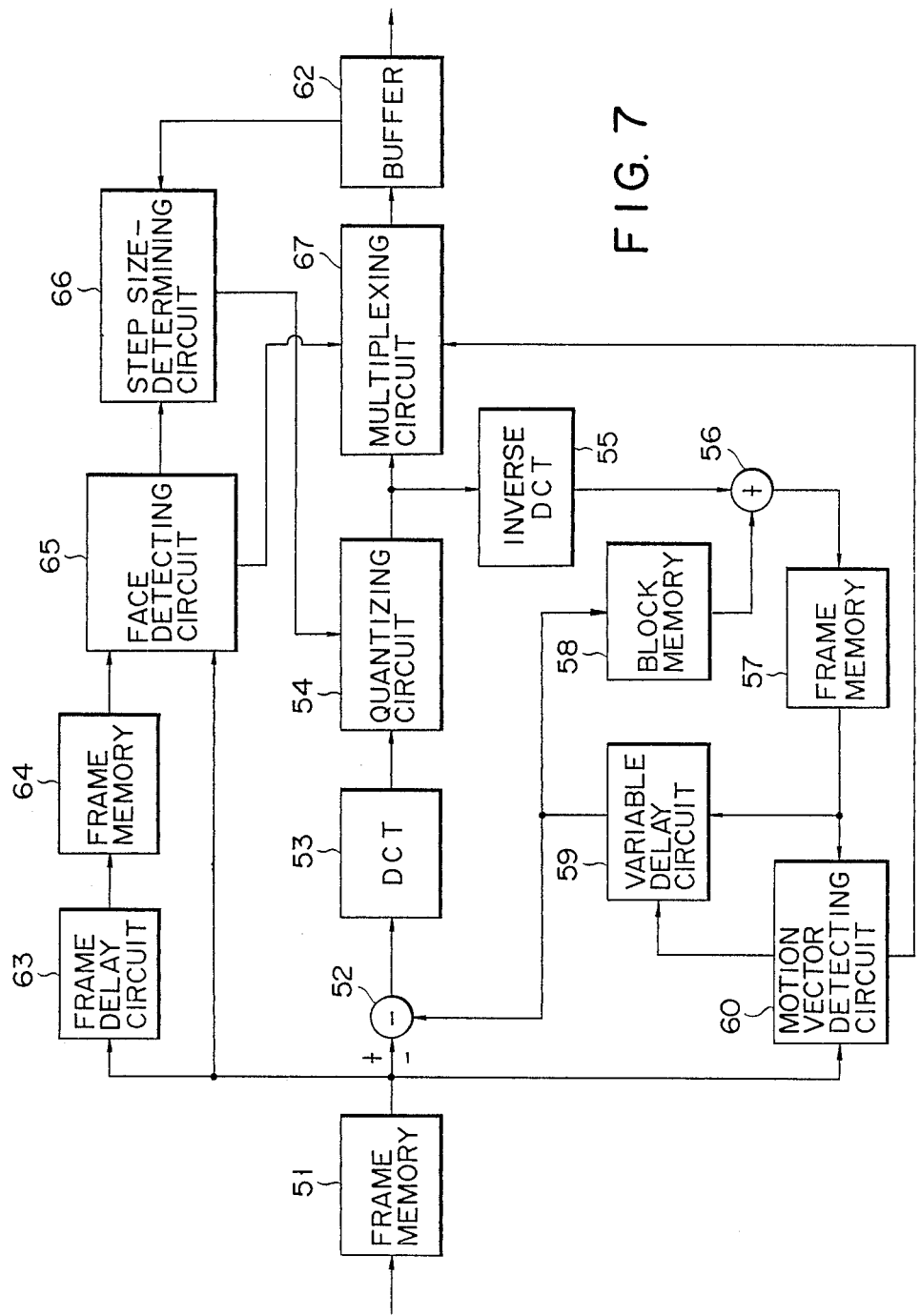
FIG. 7 is a block diagram of an image encoding apparatus according to another embodiment of the present invention.

In this embodiment, the same reference numerals denote the same parts as in FIG. 7, and a detailed description thereof will be omitted.

According to this embodiment, a conversion coefficient region (8×8 blocks) obtained by a DCT shown in FIGS. 13A and 13B is sent out while its scan direction is changed from raster-scanning to zigzag scanning by a scanning type converting circuit 81. In the zigzag scanning, a higher frequency component is scanned later. Data converted to a binary value "0" by quantization before the scanning type conversion tends to be easily generated in a higher frequency region. Therefore, upon sending of data, coefficients are monitored in the scan order, and a code EOB (End Of Block) is added after the last non-0 coefficient. Thus, a series of the following 0 coefficients are replaced with the codes EOB.

In the above method, since bit allocation is changed using face detection data detected by the face detecting circuit 65, the code EOB is inserted after the normal sending operation, i.e., the last non-0 coefficient (FIG. 13A). In a region other than the face, the code EOB is forcibly inserted at a fixed position, and the following coefficients are omitted (FIG. 13B). Thus, the number of coefficients of the region other than the face is decreased, and the number of bits to be allocated can be decreased.

In the above embodiment, address data indicating a face region may be transmitted, and a quantizing step size may be changed in accordance with the inside/outside of the face region. Before start of transmission of a movement image, an identification code indicating whether or not a bit distribution is changed may be transmitted. In addition, the identification code may transferred through a transmission line different from that for the movement image signal.

Figure 14:
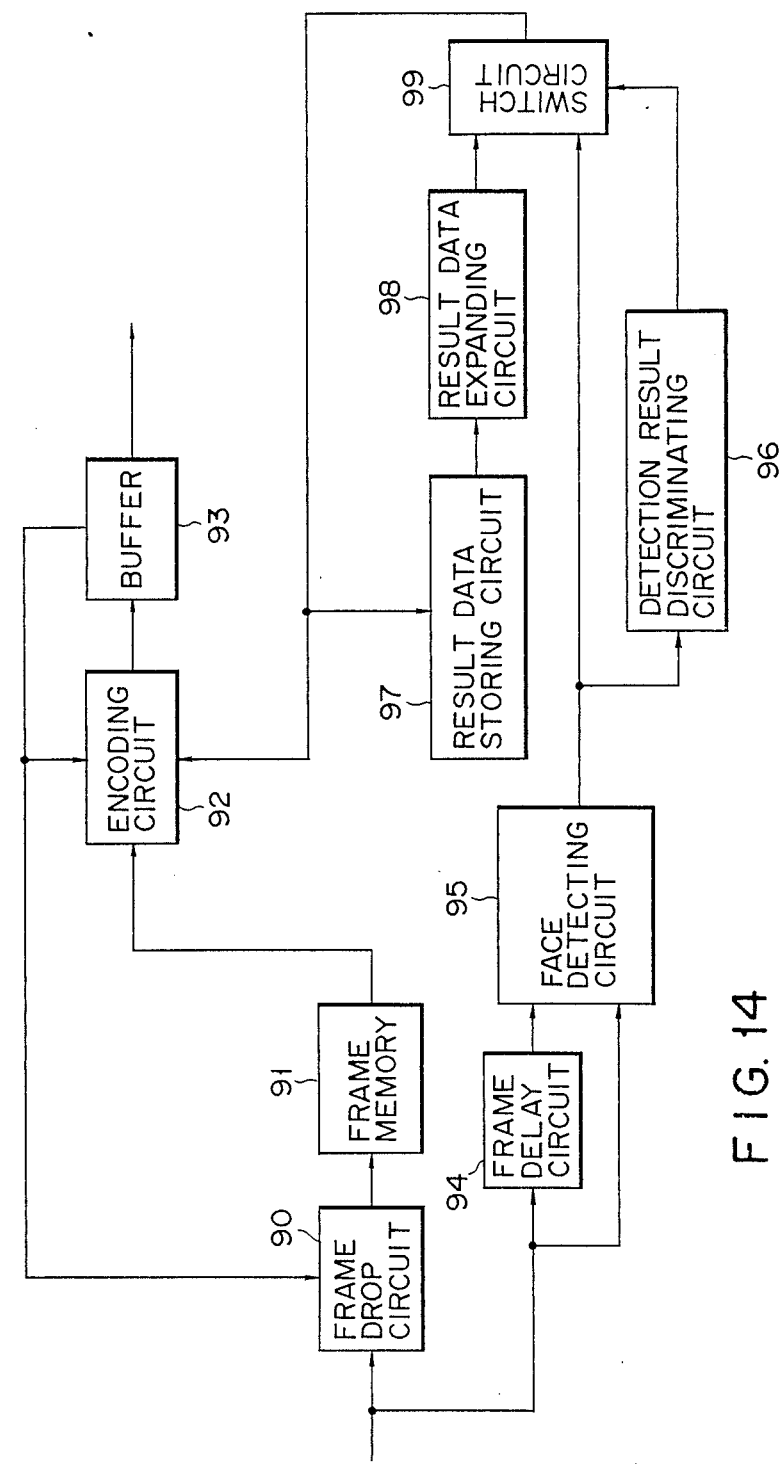
FIG. 14 is a block diagram of an image encoding apparatus according to still another embodiment of the present invention.

Still another embodiment of the present invention will be described below with reference to FIG. 14.

According to this embodiment, frame image data is stored in a frame memory 91 through a frame drop circuit 90. The frame drop circuit 90 drop input frame image data when a buffer amount of a buffer 93 exceeds a predetermined threshold value. The input frame image data is delayed by a predetermined period of time corresponding to one frame by a frame delay circuit 94. A face detecting circuit 95 detects a face region on the basis of a difference between two frame image data, and outputs face region data. The face region data is constituted by map data representing a face region as "1" and representing a region other than the face region as "0" or coordinate data of a face region surrounded by a rectangle or circle.

The face region data output from the face detecting circuit 95 is input to a detection result discriminating circuit 96 for discriminating validity of the data. In this case, the area of the face region is calculated on the basis of the face region data, i.e., the map data or coordinate data. The calculated area is compared with a predetermined threshold value. When the area is smaller than the threshold value, it is determined that the face region data is not valid. If the face region is represented by a rectangle, the length and width of the rectangular face region are compared with corresponding threshold values. If one of the length and width is smaller than the corresponding threshold value, it is determined that the face region data output from the face detecting circuit 95 is not valid. The previously detected face region data is compared with the present face region data, and if the comparison result is largely changed with respect to an area or position, it is determined that the present face region data is not valid.

A switching circuit 99 is controlled in accordance with the determination result from the discriminating circuit 96. If it is determined that the face region data is valid, the immediately preceding face region data output from a result data storing circuit 97 and a result data expanding circuit 98 or face region data obtained by correcting the immediately preceding face region data is supplied to an encoding circuit 92 and the result data storing circuit 97 as new face region data. The face region data is used for changing the numbers of bits to be allocated to the face region and a region other than the face in the encoding circuit 92. The face region data is stored in the result data storing circuit 97 as backup data when face region data obtained in the next face region detection is not valid.

The result data expanding circuit 98 expands the face region data stored in the result data storing circuit 97 according to a predetermined rule (e.g., by ten pixels in each of the four directions). When the state that the detection result is not valid is contained, the face region is enlarged as shown in FIG. 15. When this enlarging circuit is used, even if the face region cannot be appropriately detected by differential data since a person stands still, image quality of the face region can be maintained. Since a generated data amount is rather decreased, excessive bits can be allocated to a background region, thus improving image quality of a background region.

Note that the control method of the frame drop circuit 90 and the encoding circuit 92 using data which is output from the buffer 93 and represents a buffer amount, and the face region detection method of the face detecting circuit 95 are the same as those in the above embodiment.

FIG. 16 shows an embodiment wherein an amount of encoded data included in a human face region is discriminated from that in the other region. According to this embodiment, frame image data is stored in a frame memory 102 through an input terminal 101. The stored frame image data is read out from the memory 102 while being divided into a plurality of blocks under the control of a controller 106, and is encoded to a plurality of encoding blocks, as shown in FIG. 17. In this case, each block size is set to be 2×2, and pixels of a block to be presently encoded are given by $X_0$ to $X_3$. The lower right pixel $X_0$ in the block is predicted on the basis of already encoded pixels (e.g.. C in a block 7, D and E in a block 8, and A and B in a block 12). A predictor $\hat{X}_0$ can be calculated by the following equation:

$$\hat{X}_0 = A + E - C \tag{1}$$

The values A, B, C, D, and E are stored in a memory 108, and a predictor circuit 107 calculates equation (1). If $|X_0 - \hat{X}_0|$ is larger than a predetermined threshold value $TH_0$, $X_0 - \hat{X}_0$ is quantized by a quantizing circuit 104, and a quantized value $Q(X_0 - \hat{X}_0)$ is encoded by an encoding circuit 109. The predictor $\hat{X}_0$ and the quantized value are added by an adder 105, and a local decoded signal $\bar{X}_0$ can be obtained as follows:

$$\bar{X}_0 = \hat{X}_0 + Q(X_0 - \hat{X}_0) \tag{2}$$

The local decode $\bar{X}_0$ is stored in the memory 108. On the other hand, if $|X_0 - \hat{X}_0|$ is smaller than the predetermined threshold value $TH_0$, the data $(X_0 - \hat{X}_0)$ is neither quantized nor encoded.

As the local decoded signal $\bar{X}_0$, the predictor $\hat{X}_0$ having the relationship given by the following equation is stored in the memory 108:

$$\bar{X}_0 = \hat{X}_0 \tag{3}$$

The pixels $X_1$, $X_2$ and $X_3$ are then predicted. In this case, predictors $\hat{X}_1$, $\hat{X}_2$, and $\hat{X}_3$ are calculated by the following equations:

$$\hat{X}_1 = (A + \bar{X}_0)/2 \tag{4}$$

$$\hat{X}_2 = (E + \bar{X}_0)/2 \tag{5}$$

$$\hat{X}_3 = (C + \bar{X}_0)/2 \tag{6}$$

$\hat{X}_3$ can be calculated by the following equation after $\hat{X}_2$ is encoded:

$$\hat{X}_3 = (B + \bar{X}_2)/2 \tag{7}$$

Absolute values $|X_1 - \hat{X}_1|$, $|X_2 - \hat{X}_2|$, and $|X_3 - \hat{X}_3|$ between the predictors $X_1$, $X_2$, and $X_3$ and the pixels $X_1$, $X_2$, and $X_3$ are compared with corresponding threshold values $TH_i$. Only when the absolute value is larger than the threshold value $TH_i$, $X_i - \hat{X}_i$ is quantized and quantized value $Q(X_i - \hat{X}_i)$ is encoded. In this encoding method, the quantized data is encoded by a Huffman encoding method, thereby compressing data. In this case, a local decoded signal $\bar{X}_i$ is obtained by the following equation:

$$\bar{X}_i = \hat{X}_i + Q(X_i - \hat{X}_i) \tag{8}$$

A pixel having a smaller difference absolute value $|X_i - \hat{X}_i|$ than $TH_i$ is neither quantized nor encoded, and a predictor $\hat{X}_0$ having the relationship given by the following equation is used as the local decoded signal $\bar{X}_0$:

$$\bar{X}_0 = \hat{X}_0 \tag{9}$$

The threshold values $TH_i$ of the pixels may be different or the same. If the face region has a threshold value of $THI - 3 = TH0$, and the region other than the face region has a threshold value of $THI - 3 = \alpha \times TH0$, the amount of the encoded data corresponding to the face region can be discriminated from that corresponding to the other region. In other words, a larger number of bits than in the other region can be allocated to the face region.

With the above method, data indicating an encoded pixel must be encoded. For this reason, a block including one or more encoded pixels is given by a significant block "1", and a block including no encoded pixel is given by an insignificant block "0". A code string including these codes is run-length encoded.

The significant block is determined based on whether or not $X_0$ is decoded. If $X_0$ is not encoded, $X_1$ to $X_3$ are not encoded.

According to the latter method, when $X_0$ of all the blocks is encoded if $TH_0 = 0$, determination data of significance/insignificance of each block need not be encoded. In the significant block, data presenting an encoded pixel must be encoded. However, if 1 bit is allocated to each pixel and data is encoded by the Huffman encoding method, data can be compressed.

FIG. 18 shows the quantizing circuit. With this quantizing circuit, data $(X_i - \hat{X}_i)$ to be quantized is input to an absolute value circuit 122 and a sign circuit 128 through an input terminal 121. The absolute value circuit 122 converts the data $(X_i - \hat{X}_i)$ into an absolute value $|X_i - \hat{X}_i|$, and outputs the absolute value to one input terminal of a subtracter 123. The other input terminal of the subtracter 123 receives one of threshold values $TH_0$ to $TH_3$ preset for each pixel through the input terminal 121. The subtracter 123 outputs a signal $H_i$ given by the following equation:

$$H_i = |X_i - \hat{X}_i| - TH_i \tag{10}$$

When the signal $H_i$ is input to a determination circuit 124, the determination circuit 124 determines the sign of the signal $H_i$. If it is determined that the sign of the signal is negative, a switch 125 is released, and the signal $H_i$ is not quantized. If it is determined that the sign is positive, the switch 125 is closed, and the signal $H_i$ is supplied to a quantizing circuit 126 to be quantized. The quantizing circuit 126 may have either nonlinear quantizing characteristics (FIG. 19) or linear quantizing characteristics. The quantized signal output from the quantizing circuit 126 is input to an adder 127, and is added to the threshold value $TH_i$ input to the adder 127 through the terminal 121. The sum signal is supplied to the sign circuit 128, and is encoded in association with the input signal $(X_i - \hat{X}_i)$. The encoding circuit 128 outputs the encoded quantized signal $Q(X_i - \hat{X}_i)$ to an external circuit, e.g., a decoder through an output terminal 129.

The decoder must know the threshold values $TH_0$ to $TH_3$ in order to decode the signal $Q(X_i - \hat{X}_i)$. Therefore, the threshold values $TH_0$ to $TH_3$ are also encoded and supplied. If a threshold value is fixed regardless of an input image, data corresponding to input/output characteristics (FIG. 20) of the quantizing circuit 126 can be written in a ROM, and can be constituted by a single ROM.

In the above embodiment, a block size is $2\times2$. A case will be described below wherein a block is constituted by $8\times8$ pixels.

As shown in FIG. 21A, a predictor error of a lower right pixel (indicated by hatching) of $8\times8$ pixels is encoded. As shown in FIG. 21B, predictor errors of lower right pixels in $4\times4$ pixels other than a block including the previously supplied pixel (indicated by a black dot) are compared with a threshold value $TH_1$, and the predictor errors exceeding a threshold value $TH_2$ are encoded. Similarly, predictor errors of pixels other than the previously supplied pixels (indicated by black dots) and exceeding a threshold value $TH_3$ are encoded, as shown in FIG. 21C. The processing described above is performed separately for inter-frame prediction and intra-frame prediction, and significant pixels exceeding threshold values are supplied. In the inter-frame prediction, a corresponding motion-vector-detected pixel in the immediately preceding frame is used as a predictor, while in the intra-frame prediction, the predictor of the pattern shown in FIG. 21A can be calculated by the following equations:

$$X_0 = A(|B-A| \geq |B-C|)$$

$$X_0 = C(|B-A| < |B-C|)$$

The predictors of the pattern shown in FIG. 21B can be obtained by the following equations:

$$\hat{X}_1 = (X_0 + A)/2$$

$$\hat{X}_2 = (X_0 + C)/2$$

$$\hat{X}_3 = (X_0 + d)/2$$

The predictors of the patterns shown in FIGS. 21C and 21D can be obtained by the above equations. A significant pixel pattern formed based on the predictors obtained as described above can be compressed by three pixels for each of patterns shown in FIGS. 21A to 21D, i.e., variable-length encoded and can be transmitted.

In the above embodiment, the number of pixels in each block is $N \times M$ = an even number. The present invention can be applied to the case wherein the block is constituted by $3\times3$ pixels (= odd number), as shown in FIG. 22. In this case, $X_0$ can be calculated in the same manner as in the above embodiment. However, for example, a method of calculating $X_1$ and $X_4$ is different from the above embodiment, and $X_1$ and $X_4$ are calculated as follows:

$$\hat{X}_4 = (2A + X_0)/3$$

$$\hat{X}_1 = (A + 2X_0)/3$$

$\hat{X}_2$ and $X_8$ can also be calculated by the above equations.

An embodiment wherein the above-mentioned quantizing and encoding methods are applied to a movement image will be described below with reference to FIG. 23.

An image signal input through an input terminal 131 is stored in a memory 132 in units of frames or blocks. Each block is constituted by $8\times8$ pixels. When this block is input to a significant block detecting circuit 133, the circuit 133 detects a significant block from the input block. Upon detection of the significant block, a difference between the present block and the immediately preceding corresponding block is calculated, and an accumulated sum of the squared values of differences is compared to a predetermined threshold value $TH_B$. If the accumulated sum is larger than $TH_B$, the corresponding block is determined as a significant block. If the input block is not a significant block, a frame memory 142 is not rewritten.

If the input block is the significant block, a movement vector indicating a parallel movement amount of an image is detected by a motion vector detecting circuit 134. The address is shifted by a value corresponding to the motion vector, and the memory 142 is addressed by the updated addresses, thus obtaining a motion-vector-compensated inter-frame predictor signal $X_v$. The block is divided into $2\times2$ subblocks, as shown in FIG. 17, and image signal processing is performed for each subblock. If the pixels of the present subblock are represented by $X_0$ to $X_3$, the intra-frame predictor $XI_0$ of the lower right pixel $X_0$ can be calculated as follows:

$$\hat{X}I_0 = A + E - C \tag{11}$$

The inter-frame predictor $\hat{X}v_0$ is a corresponding motion-vector-compensated pixel value in the immediately preceding frame. A predictor selector 138 determines which one of $XI$ and $Xv$ is selected. In this determination, if the absolute value of a difference between a pixel A or B closest to $X_0$ and a corresponding pixel of a preceding frame is larger than a predetermined threshold value $TH_S$, the inter-frame predictor is selected by a switch 136; otherwise, the intra-frame predictor is selected by the switch 136.

A difference between $X_0$ and the selected predictor $\hat{X}P_0$ is calculated by a subtracter 135, and is quantized by a quantizing circuit 137. The quantizing circuit 137 is arranged as shown in FIG. 18. Only when the absolute value of the difference is larger than a threshold value, the difference is quantized. Note that the threshold value can be changed according to a stored amount of a buffer 144. If the output from the quantizing circuit 137 is $Q(X_0 - \hat{X}P_0)$, a local decoded signal is obtained as follows:

$$\tilde{X}_0 = \hat{X}_0 + Q(X_0 - \hat{X}P_0) \tag{12}$$

If the absolute value of the difference is not quantized,
$$Q(X_0 - \hat{X}P_0) = 0.$$

Intra-frame predictors to $\hat{X}I_1$ to $\hat{X}I_3$ of the pixels $X_1$ to $X_3$ are obtained by equations (4) to (6), and interframe predictors $\hat{X}v_1$ to $\hat{X}v_3$ are read out from the frame memory 142. The predictor selector 138 determines based on a pixel closest to the already encoded pixel which one of the intra- and inter-frame predictors is selected. For $X_1$ to $X_3$, since the intra-frame predictors have considerably smaller predictor errors, the intra-frame predictors can always be selected. The absolute value $|X_i - \hat{X}p_i|$ of a difference between the selected predictors $\hat{X}p_i$ and $\hat{X}_i$ is compared with a threshold value $TH_i$. Only when the absolute value of the difference is larger than the threshold value $TH_i$, the difference $(X_i - \hat{X}p_i)$ is quantized, and the quantized value $Q(X_i - \hat{X}p_i)$ is encoded by the Huffman encoding method. A locally decoded signal $\bar{X}_i$ in this case can be obtained by the following equation:

$$\bar{X}_i = \hat{X}_i - Q(X_i - \hat{X}_{pi}) \qquad (13)$$

If the difference is not quantized,
$Q(X_i - \hat{X}_{pi}) = 0$.

Significant block data, significant subblock data, significant pixel data, and the like are also encoded by the run-length encoding method, Huffman encoding method, or the like. The threshold values $TH_0$ to $TH_4$ are changed in accordance with a buffer amount in units of frames, and are encoded at the beginning of a frame. If the threshold values $TH_0$ to $TH_4$ are fixed, they need not be encoded. The buffer 144 has a function of smoothing a speed of encoded data and outputting the encoded data.

Still another embodiment of the present invention will now be described with reference to FIG. 24.

In FIG. 24, an image signal input to an input terminal 201 is stored in a frame memory 202 frame by frame. The image signal read out from the memory 202 is supplied to a movement region data encoding circuit 203. Of the input image, an image signal corresponding to a movement region is encoded. In the movement region data encoding circuit 203, the input image is divided into a plurality of image data blocks by a dividing circuit 204. The blocks are supplied to a significant block determining circuit 205 and a differential circuit (or subtracter) 206. The significant block detecting circuit 205 determines whether or not an input image data block is significant. The differential circuit 206 calculates a difference between the input image data block and a data block stored in a frame memory 211 and corresponding to the input data block. If the difference is small and when a map forming circuit 223 (to be described later) determines that the entire block corresponds to a background, the significant block detecting circuit 205 determines the input data block as an insignificant block, and does not send the input data block to the next stage. Otherwise, the input data block is determined as a significant block. Thus, a block address of the input data block is supplied to a multiplexing circuit 228, and image data in the data block is supplied to a differential circuit 207 and a motion vector detecting circuit 208.

Image data stored in the frame memory 201 is also supplied to the map forming circuit 223 and a background image processing section (or background memory) 224. As will be described later, the background image processing section 224 calculates a difference between images of two adjacent frames of input images, e.g., a frame difference between two successive frames, and detects a contour of a movement region in the difference image. The section 224 determines input image data outside the contour as a background image, and stores it as background image data. The map forming circuit 223 compares the background image data stored in the background image processing section 224 with image data of a new input frame so as to separate the image data of the new input frame into a background region and a movement region and to form a map indicating a boundary (contour of the movement region) therebetween. The formed map is used for encoding on the transmission side in the significant block detecting circuit 205, the motion vector detecting circuit 208, a conditional pixel replenishment determining circuit 213, a background change circuit 214, and is encoded by an contour encoding circuit 227 to determine whether reception data (movement region data) is output or the content of the background image processing section 224 is output upon decoding on the reception side. As an example of an encoding method of contour data in the outline encoding circuit 227, a variable-length chain encoding method shown in FIG. 25 can be used. In this method, two bits are allocated to each image in a total of three directions (indicated by solid arrows in FIG. 25) and four bits are allocated to each in other directions (indicated by broken arrows in FIG. 25) to have a moving direction (indicated by a bold arrow in FIG. 25) from a preceding pixel as the center. In another encoding method, a sample dot string of an contour is represented by relative coordinates to be encoded, and on the reception side, points between the adjacent decoded sample dot strings are spline-interpolated.

The motion vector detecting circuit 208 receives image data of a block which is determined as a significant block by the significant block detecting circuit 205 and map data which is output from the map forming circuit 223 as boundary data between the background and movement regions, and retrieves the content of the frame memory 211 storing the input image of the immediately preceding frame so as to detect an optimal motion vector. In this case, in an input block and a retrieved block, pixel values of pixels corresponding to the background portion of the input block are cleared to zero, errors are evaluated, and matching is then performed (see FIG. 26). Thus, the motion vector detected by the motion vector detecting circuit 208 can be prevented from being influenced by a background.

The movement vector detected by the motion vector detecting circuit 208 is supplied to the multiplexing circuit 228 and is also input to a variable delay circuit 209. When image data is supplied from the frame memory 211 to the variable delay circuit 209, the variable delay circuit 209 supplies image data of a block having an offset corresponding to the motion vector to the differential circuit 207 and a block memory 210. In the differential circuit 207, a predictor error between the input block and a motion-vector detected predictor block is calculated. Of the predictor error, an error at a position corresponding to a movement region of the input block is evaluated by the conditional pixel replenishment determining circuit 213. When the error is small, the conditional pixel replenishment determining circuit 213 determines to replenish conditional pixels for the block, and supplies a determination signal to the multiplexing circuit 228 and the block memory 210. In addition, the circuit 213 stops supply of the predictor error to the next stage (background change circuit 214). Upon reception of the determination signal, the block memory 210 transfers the stored image data, i.e, image data selected by the variable delay circuit 209 to the frame memory 212.

When the conditional pixel replenishment determining circuit 213 determines that an error at a position corresponding to the movement region of the input block of the predictor error calculated by the differential circuit 207 is large, the predictor error is input the background change circuit 214. In this case, in order to improve conversion efficiency, the background change circuit 214 replaces pixels at positions corresponding to the background of the input block with a calculated predetermined value. As a value for improving the conversion efficiency, a luminance of the most contour of the movement region, or an average luminance of pixels in the movement region can be used. FIGS. 27(a) and 27(b) show a case wherein background pixels are changed with the most contour luminance. FIG. 27(a) shows a state before the pixels are changed and FIG. 27(b) shows a state after the pixels are changed.

Image data of a block in which luminance values of the background portion are changed is cosine-converted by a DCT circuit 216, and a conversion surface is divided into a plurality of regions. A significant region detecting circuit 217 determines based on a threshold value whether or not these regions are significant regions. The significant region detecting circuit 217 supplies an address of a region determined as a significant movement region to the multiplexing circuit 228, and image data of the significant movement region is input to a normalizer/quantizer circuit 218 to be normalized and quantized. The normalizer/quantizer circuit 218 supplies a normalization coefficient and quantized data to the multiplexing circuit 228 and an expansion circuit 220. The quantized data is locally decoded by a local decoder including a inverse quantizing circuit 219, an expansion circuit 220, an IDC circuit 221, and an adder 222, and is stored in a frame memory 212. The image data stored in the frame memory 212 is transferred to the frame memory 211 at a frame timing, and is evaluated by the motion vector detecting circuit 208 and the significant block detecting circuit 205.

Background image data stored in the background memory 224 is input to a background transmission control circuit 225. The background transmission control circuit 225 always monitors the amount of a content of a buffer 229 connected to the output of the multiplexing circuit 228. When the amount of the content of the buffer 229 is decreased, the control circuit 225 causes the background memory 224 to supply many image data to a background encoding circuit 226. The background transmission control circuit 225 also monitors addresses of already transmitted pixels in the background memory 224. Data read out from the background memory 224 is encoded by the background encoding circuit 226. The background encoding circuit 226 generates a header in synchronism with a frame, and the encoding result (background data) of background image data is supplied to the multiplexing circuit 228. The header includes a frame header, and data (background header) obtained by variable-length encoding data associated with the number of bits of the subsequent background data. With this background header, the background data and the movement region data are distinguished from each other. As an encoding method of background image data in the background encoding circuit 226, DPCM in units of pixels, transform coding in units of blocks, or vector quantization can be employed.

The background data (frame header, background header, and background data) obtained from the background encoding circuit 226 is time-divisionally multiplexed with contour data (contour header and contour data) from the contour encoding circuit 227, movement region data (significant address from the significant block detecting circuit 205, conditional pixel replenishment data from the conditional pixel replenishment determining circuit 213, significant movement region data from the significant region determining circuit 217, the normalization coefficient and quantized data from the normalizer/quantizer circuit 218. The multiplexed data having a frame arrangement shown in FIG. 28 is transmitted to the reception side through the buffer 229.

Note that as a method of sending background data stored in the background memory 224, the following methods (1) to (4) may be employed.

(1) A predetermined amount of data is sent in synchronism with a frame.

In this case, the background transmission control circuit 225 performs transmission control regardless of the amount of the content of the buffer 229.

(2) A predetermined amount of background data is inserted in every predetermined amount of data in the buffer 229.

In this case, the output from the background encoding circuit 226 is supplied to the buffer 229.

(3) Data is transmitted when the content of the background memory 224 is prepared to an extent.

In a first method, the number of updated pixels of the entire frame is counted after scene change, and when the ratio of the updated pixels exceeds a predetermined value, the entire data is transmitted. In a second method, the background memory 224 is divided into a plurality of blocks, and when all the pixels in a block are updated at least once after scene change, data is transmitted together with a block address. In the latter method, the size of block and an encoding method may be or may not be the same as those used when movement region data is transmitted. In either method, a control device is necessary for performing the following operations: managing an updating condition of the background memory 224 after scene change using a map, and for, when pixels the number of which exceeds a predetermined ratio of the frame are simultaneously changed, determining a scene change, and clearing of the map indicating the updating condition in response to the determination of the scene change.

Figure 29:
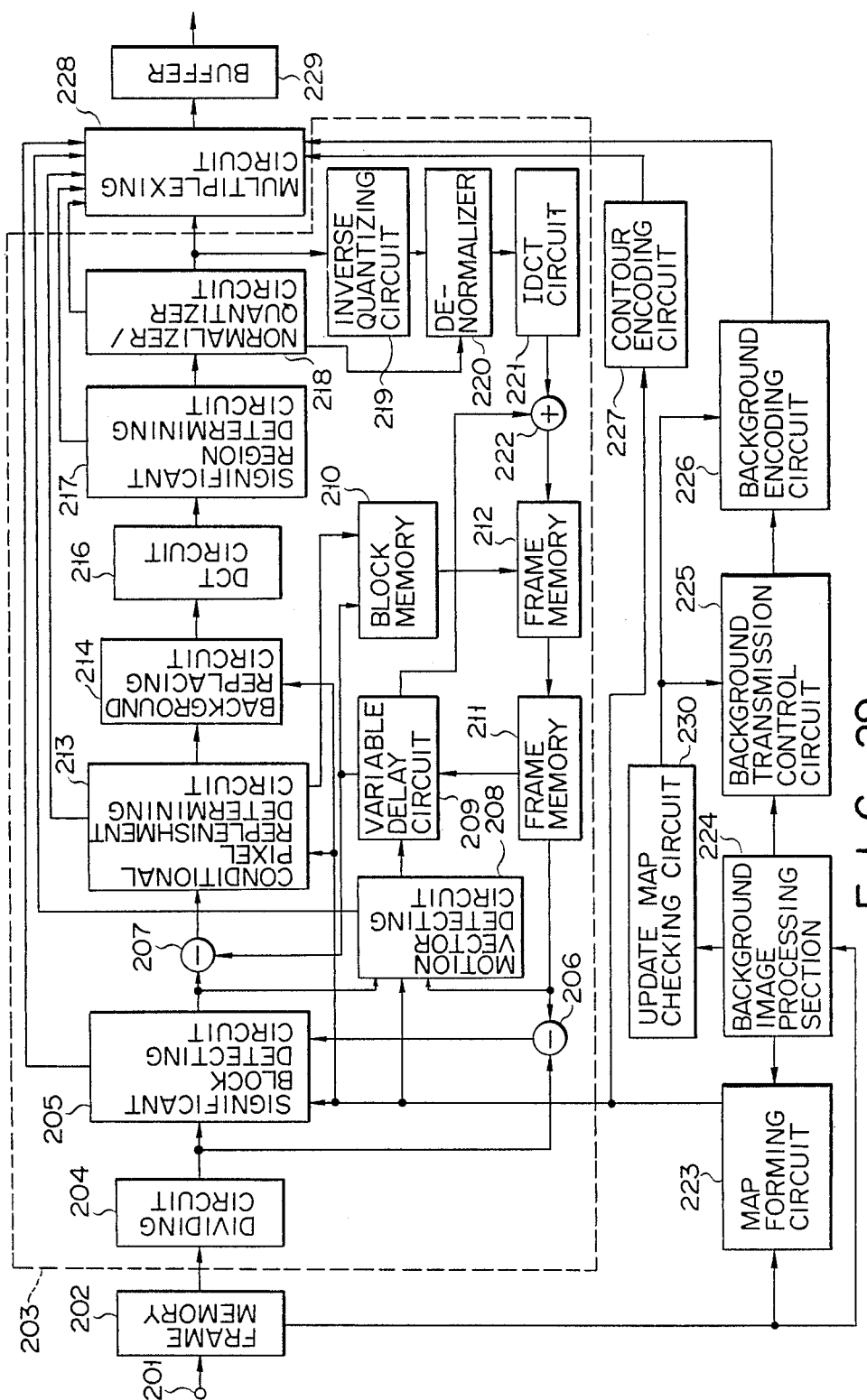
FIG. 29 is a block diagram of an image encoding apparatus according to still another embodiment of the present invention.

FIG. 29 shows an embodiment using the method (3). The arrangement shown in FIG. 29 is substantially the same as that in the embodiment shown in FIG. 24, except that an update map checking circuit 230 is added. The update map checking circuit 230 stores an already updated history (an updated history = 1 or more is "1"; 0 is "0") after the scene change as an update map in units of pixels on the basis of a map representing a separation result of background and movement regions stored in the background memory 224. Every time a map is input, the number of pixels of a movement region in a frame is counted. When the count exceeds a predetermined threshold value, it is determined that a scene change occurs, and all the pixels of the update map are cleared to 0. The updating condition is observed in units of blocks, and when all the pixels in a block are updated, a corresponding block address is output to the background transmission control circuit 225 and the background encoding circuit 226. In this case, the background encoding circuit 226 encodes the background data of a block corresponding to the input block address in units of blocks, and outputs the encoded data to the buffer 229.

In this method, a background buffer (not shown) is connected to the output of the background encoding circuit 226, and background data can be transmitted in accordance with the content of the buffer 229, as in the embodiment shown in FIG. 24. Alternatively, a predetermined amount of background data can be transmitted in synchronism with a frame like in the method (1), or a predetermined amount of background data can be transmitted regardless of the frame like in the method (2).

(4) The content of the background memory is formed by data of those sent as movement region data.

According to an embodiment shown in FIG. 30 using the above-mentioned method, the significant block detecting circuit 205 receives the frame difference image, a difference image between the input image data from a differential circuit 232 and background image data stored in the background memory 224, and data indicating an updating condition of the background memory on the reception side and supplied from an update map checking circuit 231. A transmission mode is controlled by the following rules:

(I) difference image between input image and background image $\leq$ threshold value 1, already updated block $\rightarrow$ insignificant block (output from the background memory 224)

(II) difference image between input image and background image $\leq$ threshold value 1, non-updated block $\rightarrow$ significant block (updating of the content of the reception-side background memory and fixing of the motion vector to 0)

(III) difference image between input image and background image > threshold value 1, frame difference $\leq$ threshold value 2 $\rightarrow$ insignificant block (output from the frame memory)

(IV) difference image between input image and background image > threshold value 1, frame difference > threshold value 2 $\rightarrow$ significant block (movement region)

In this case, the significant block detecting circuit 5 outputs data for selecting 2 bits per block in accordance with the conditions (I) to (IV). Only when the condition (II) is selected, the significant block detecting circuit 205 outputs an update signal to the update map checking circuit 231, stops the operation of the motion vector detecting circuit 208, and outputs a signal for fixing the motion vector to 0. In this method, in order to prevent erroneous updating of the reception-side background memory, a small threshold value is preferably used.

Figure 32:
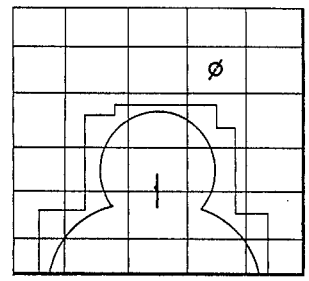

FIG. 31 shows the arrangement of the background image processing section 224 shown in FIG. 24 in detail. A frame drop circuit 241 performs control for supplying input images of two adjacent frames to frame memories 242 and 243 in order to obtain a difference image between the two adjacent frames, and frame-drop control using a processing end signal from an update control circuit 249 in order to form an appropriate interval between the two frames. A frame difference image of the input images of the two frames in the frame memories 242 and 243 is converted to absolute-value image data by an absolute value circuit 245, and the image data is stored in a frame memory 246. The absolute-value image data in the frame memory 246 is input to a contour detecting circuit 247. The contour detecting circuit 247 detects a rough contour enclosing a true contour by using the absolute value. A map forming circuit 248 forms a map indicating an update position shown in FIG. 32 on the basis of the output from the contour detecting circuit 247. The update control circuit 249 updates the content of a background image memory 250 with the content of the frame memory 242 with reference to this map or stores the content of the background image memory 250. A delay circuit 251 delays the output from the frame memory 243 by a time corresponding to a processing time of a differential circuit 244, the absolute value circuit 245, the frame memory 246, the contour detecting circuit 247, the map forming circuit 248, and update control circuit 249. The delayed frame image data is written in the background frame memory in units of pixels only when updating is permitted by a signal from the update control circuit 249.

The operation principle of the background image processing section will be briefly described below.

Figure 33:
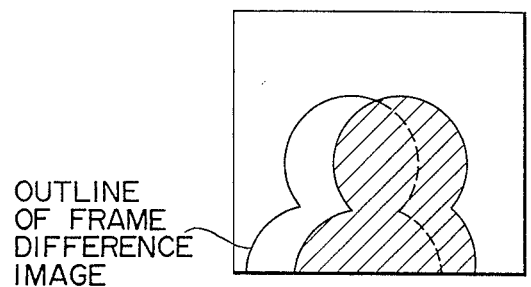
Figure 34:
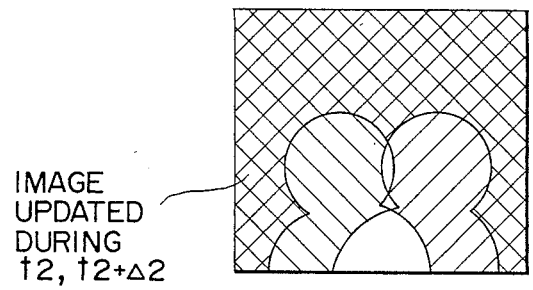

FIG. 33 shows an outline of a movement region (in this case, a person) obtained based on a frame difference image. Since a portion inside the contour includes the movement region of the presently input frame (indicated by hatching) and a new background portion upon comparison with the previously input frame, a concealed background cannot be updated by a single updating operation. However, when a person moves, a portion which cannot be updated in a first updating operation may be updated in a second or subsequent updating operation. As shown in FIG. 34, a portion newly included in a portion outside the contour of the frame difference image is updated, so that only a background can be stored in the background memory 224.

Figure 37:
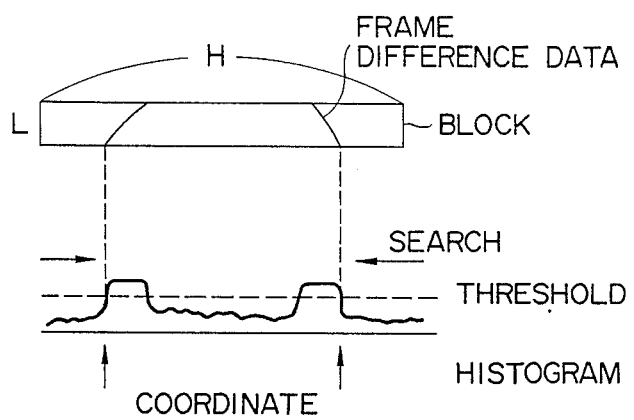
FIG. 37 is a view for explaining the principle of a contour extraction method.

For this reason, as shown in FIG. 35, images of two adjacent frames along the time base must be employed so as to reduce an area of a background region inside the outline. In this case, an interval between the two frames can be arbitrarily set in accordance with an updating interval and a processing time. In FIG. 35, frames between $t1+\Delta1$ and $t2$, $t1$ and $t1+\Delta1$, and $t2$ and $t2+\Delta2$ are dropped by the frame drop circuit 241. In this case, $\Delta1$ and $\Delta2$ can be frame intervals. A frame difference image 1 is obtained by a difference between the frames $t1$ and $t1+\Delta1$, and a frame difference image 2 is obtained by a difference between the frames $t2$ and $t2+\Delta2$. Portions outside the contours are updated as shown in FIG. 35. In FIG. 34, a portion of hatched lines inclined upward to the right is updated during a time interval ($t1$, $t1+\Delta1$), and a portion of hatched lines inclined downward to the right is updated during a time interval ($t2$, $t2+\Delta2$). FIG. 36 shows an arrangement of the contour detecting circuit 247 shown in FIG. 30. A dividing circuit 261 extracts L $\times$ H (H = a length of one side of a frame) strip blocks shown in FIG. 37 from a frame memory storing the frame difference image in vertical and horizontal directions. A histogram forming circuit 262 forms a histogram in the short-side direction of the strip. An edge detecting circuit 263 searches the histogram from the two edges of the strip while comparing it with a given threshold value. The circuit 263 outputs coordinates of points where searched values exceed the threshold value as contact points of an outline for the first time.

Figure 38A:
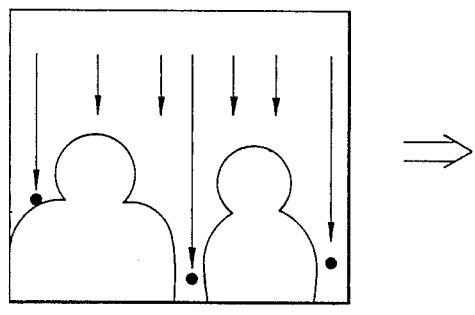
FIG. 38 is a view for explaining the principle of another contour extraction method.
Figure 38B:
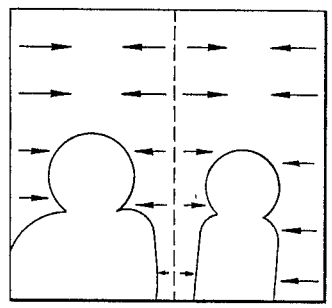

FIG. 38 shows an improved operation principle of contour detection method. In this method, a contour edge is searched in the vertical direction, and edge positions of outlines in strips at both the edges of a frame, and a position of a strip in which an edge position has a minimum value are obtained. Thereafter, horizontal search starts from a portion above the detected contour edges at both the edges of a frame and from a portion above the detected contour edge at a position where the strip having a minimum value is present. Thus, contour detection can be performed even when there are two persons or when a movement region starts from the edge of the frame.

A method of searching the minimum value will be explained below. Assume that a contour position shown in FIG. 39 is obtained. When a strip having a minimum value is searched from this coordinate series, a very local minimum value point may often be obtained, as indicated by an arrow in FIG. 39. In order to exclude such a minimum value point and to select a significant minimum value point, the coordinate series data is sampled through a low-pass filter, so that a minimum value point is roughly searched. The original series data is searched in detail around the found minimum value position. Such a hierarchical search can be performed.

This state is shown in FIGS. 40A-40C. FIG. 40A shows a profile of contour position coordinates. The coordinate series data is passed through a low-pass filter so as to obtain a profile from which local changes are removed, as shown in FIG. 40B. This profile is subsampled to search candidates of a minimum value at positions indicated by marks "O". In profile (FIG. 40B), a mark "O" indicates a candidate of a found minimum value. A zone surrounded by dotted lines in profile of FIG. 40C, surrounding the candidate of the minimum value, and obtained in profile (FIG. 40B) is searched, and a minimum value obtained from the zone is employed as a true minimum value. In this manner, the minimum value can be searched.

A method of separating background and movement regions performed by the map forming circuit 223 shown in FIG. 24 will be described with reference to FIG. 41. As shown in FIG. 24, the map forming circuit 223 receives the input image data from the frame memory 202 and image data read out from the background memory 224. When a difference image between these data is obtained and its contour is detected, a region including an contour of an actual movement region may often be obtained. Thus, an imaginary band of a constant width is formed inside the outline, and pixel data in a portion inside the band is multiplied with an edge detection operator (e.g., Sobel operator). Pixels having large products are searched in the widthwise direction of the band, thus forming a new contour.

Figure 42:
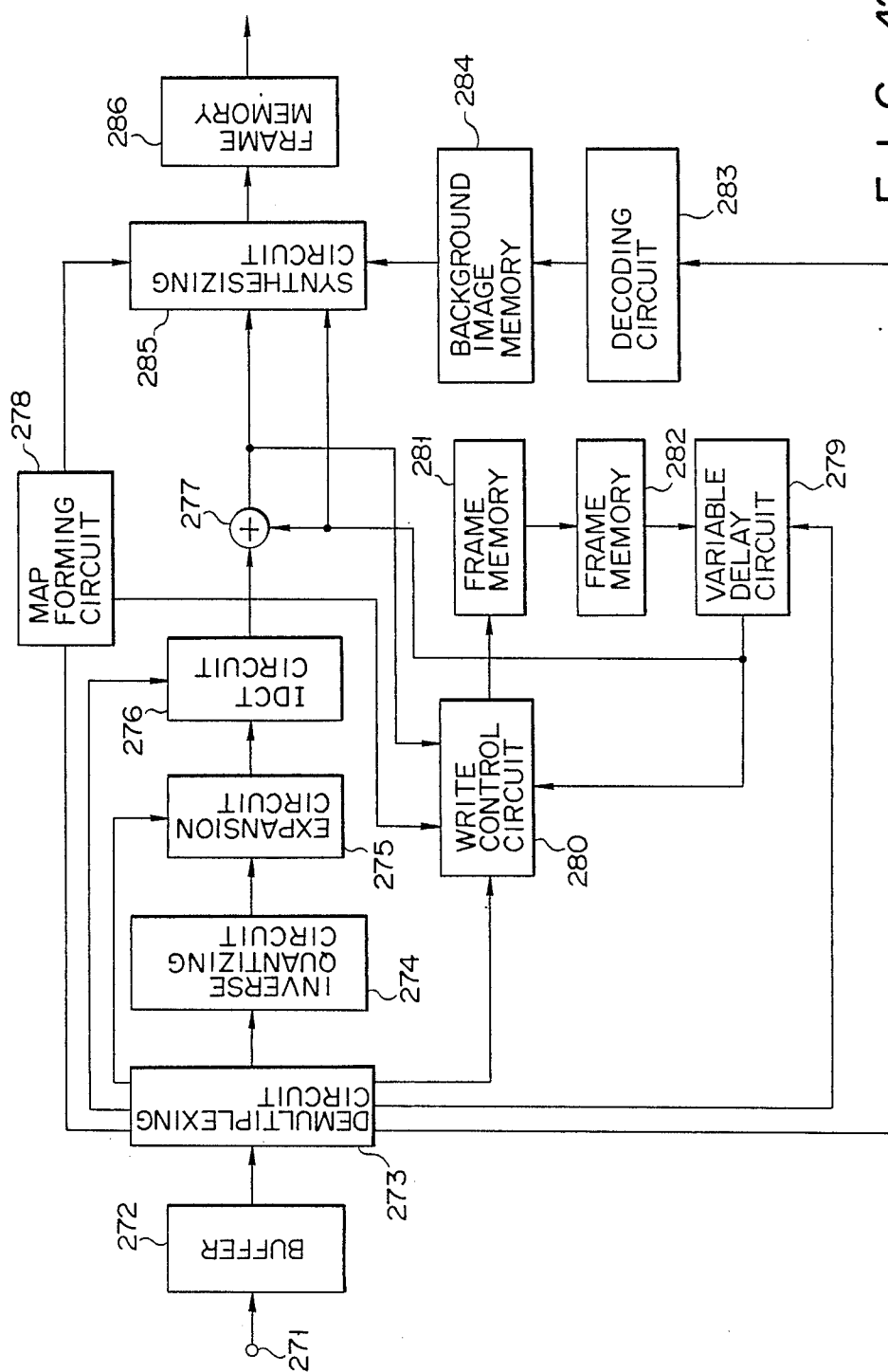
FIG. 42 is a block diagram of a receiving section for processing a signal sent from a transmitting section of the image encoding apparatus.

FIG. 42 is a block diagram showing a reception-side arrangement corresponding to the transmission-side arrangement shown in FIG. 24. In FIG. 24, a signal input from the transmission side to an input terminal 271 is temporarily stored in a buffer 272, and is separated into background data (= header + encoded background data), movement region data (= block address, motion vector, Conditional pixel replenishment data, significant region data, normalization coefficient, and quantized data), and contour data by a demultiplexing circuit 273. The quantized data is inverse-quantized by an inverse quantizing circuit 274, and is denormalized by a denormalizer 275 with reference to the normalization coefficient. The denormalized data is arranged in units of regions, and is subjected to inverse cosine transform by an IDCT circuit 276. The transformed data is output to an adder 277.

The motion vector is input to a variable delay circuit 279, and a block corresponding to the motion vector is selected from a frame memory 282. The selected block is input to the adder 277. The output from the adder 277 is written at a position corresponding to the block address in a frame memory 281 by a write control circuit 280. When conditional pixels are replenished, the output from the variable delay circuit 279 is directly written in the frame memory 281 by the write control circuit 280. The content of the frame memory 281 is transferred to the frame memory 282 in synchronism with a frame.

The background data separated in the demultiplexing circuit 273 is decoded by a decoding circuit 283, and the decoded data is written in a background image memory 284. The contour data is decoded by a map forming circuit 278 to be converted to a map.

The movement region image data from the adder 277 and the variable delay circuit 279 and the background image data from the background image memory 284 are synthesized by a synthesizing circuit 285 in accordance with the map from the map forming circuit 278, and the synthesized data is stored in a frame memory 286. Thereafter, the synthesized data is output to a monitor (not shown) and is displayed thereon. In this case, for a background, the content of the background image memory 284 is successively displayed unless a scene change occurs. Thus, an image which is free from flickering and is easy to see can be obtained.

According to the present invention, a contour of a movement region in a difference image between images of two adjacent frames of input images is detected, and input image data outside the outline of the movement region is stored as background data while being updated every time a new input image is input, and is transmitted together with movement region data. At the reception side, the movement region image data is decoded based on the movement region data, and received background image data is stored until new background image data is received. The background image data and the decoded movement region image data are synthesized and output. Once background image data is output, the same background data is not repetitively output regardless of a change in luminance. Therefore, a compression ratio of a data amount to be transmitted can be increased, and the background portion of an output image at the reception side can be prevented from flickering due to a change in luminance and block distortion. As a result, a high-quality image can be obtained.

Still another embodiment of the present invention will be described below with reference to FIG. 43.

An image signal is stored in a frame memory 301 in units of frames. The frame image data read out from the frame memory 301 is divided into a plurality of blocks by a dividing circuit 302, and the blocks are input to a significant block determining circuit 303. The image signal stored in the frame memory 301 is also input to a map forming circuit 313 and a background image processing section 314. The background image processing section 314 including a background memory detects an outline of a movement region, and determines a portion outside the contour as a background, so that its storage content of the memory 314 can be rewritten by the input frame image data. The map forming circuit 313 compares already stored background image data and a new input image signal, and separates the input frame image into a background image and a movement region, thus forming a map indicating a separating region. The formed map is used for the following movement detection, determination of a significant block, and conditional pixel replenishment. The map data is encoded by a contour encoding circuit 315, and is used for determining whether reception data is output or the content of the background memory is output when it is decoded by at the reception side. An encoding method using the map data can be used in an encoding circuit 306.

The significant block detecting circuit 303 which receives the map data determines whether an input block is present outside or inside the contour, or extends across the contour. When the block is present outside the contour, the circuit 303 determines the block as an insignificant block, and inhibits transfer of the block to the next stage. Otherwise, the input block is determined as a significant block, and is transferred to a following differential circuit 304 and a motion vector detecting circuit 307. The motion vector detecting circuit 307 receive the significant block and the map data, and determines an optimal motion vector on the basis of immediately preceding frame image data stored in a first frame memory 311 in association with the significant block and the map data. The motion vector is obtained by the method described with reference to FIG. 26.

The motion vector is supplied to a variable delay circuit 308 and a multiplexing circuit 319. The variable delay circuit 308 reads out a block having an offset corresponding to the vector from the first frame memory 311, and supplies the readout block to the differential circuit 304 and a block memory 322. The differential circuit 304 calculates a predictor error between the input block and a motion-vector-detected predictor block. A difference of a position corresponding to the movement region of the input block in the predictor error is evaluated by a conditional pixel replenishment determining circuit 305. If the error is smaller than a predetermined value, the conditional pixel replenishment determining circuit 305 determines that the input block requires conditional pixel replenishment, and outputs a replenishment determination signal to the multiplexing circuit 319 and the block memory 322. In response to this signal, the storage content of the block memory 322 is transferred to a second frame memory 312, thus interrupting transfer of the predictor error to the next stage. If the error is larger than the predetermined value, the predictor error is supplied to the encoding circuit 306 and is encoded. The encoded predictor error data is supplied to the multiplexing circuit 319. The data is locally decoded by a decoding circuit 309, and is stored in the second frame memory 312. The frame image data stored in the second frame memory 312 is transferred to the first frame memory 311, and is referred to during movement detection.

On the other hand, the background data is transmitted at the beginning of communication or only when a background transmission request is sent from the transmission side. The background image processing section 314 selects only a background portion from the input frame, and is always updated. An external recording device 316 comprises a rewritable recording device such as a floppy disk, cassette tape, IC card, VTR, DAT, or the like or a compact and easily replaceable memory such as a non-rewritable recording device, e.g., an optical card, CD-ROM, or the like, and its handler, and stores another background used as a substitute of a true background. The content of the background can be easily formed by a user using a floppy disk or video equipment. When such equipment is used, an image in which a transmission-side person is photographed in a best condition or an image which has a clearest background can be utilized. A selection circuit 317 determines based on setting at the transmission side whether the content of the background memory 314 or the external recording device 316 is transmitted as a background. The selected background data is encoded by a background encoding circuit 318. In this case, if the background data is encoded in advance, the background encoding circuit 318 can be omitted.

The movement region data from the multiplexing circuit 319 and the background data output from the background encoding circuit 318 are supplied to an output switching circuit 320. The output switching circuit 320 is switched to a background output side at the beginning of Communication and when the background transmission request is sent from the transmission side; otherwise, the output switching circuit 320 is switched to a movement region output side. As a method of using the background transmission request, the following method is known.

More specifically, a kind of security function can be proposed. That is, when a receiving station receives an incoming call, it selects a background output from the external recording device 316. After a calling party is confirmed, the receiving station selects the background data stored in the background image memory of section 314, and then outputs a background transmission request to perform normal speech communication. In this case, movement region data can be inhibited from being transmitted from call incoming to the second background transmission request.

Whether a signal is a movement region or background signal can be determined by a method of wiring data representing a movement region or background in a frame header added to each frame at the transmission side. In this case, when a background transmission request shown in FIG. 44 is issued, the output switching circuit 320 starts reading of a movement region signal, and when the next frame header arrives, it switches a movement region transmission selection bit to a background transmission selection bit. Thereafter, the circuit 320 sends background data, and supplies write inhibition data to the second frame memory 312. Upon completion of transmission of background data, when the next frame header of a movement region signal is input, transmission of movement region data is restarted. In this case, movement region data 2 and 3 are not transmitted.

The background image processing section 314 shown in FIG. 43 is the same as that shown in FIG. 31, and the operation principle of this section is the same as that described with reference to FIG. 35. The operation of the contour detecting circuit 247 has already been described with reference to FIGS. 36 and 37.

The receiving section will be described below with reference to FIG. 4.

Data transmitted from a transmitting unit is temporarily stored in a buffer 401, and is then input to a selection circuit 402. The selection circuit 402 selects a destination of received data in accordance with whether the received data is movement region data or background data.

If the background data is received, the background data is sent to a background decoding circuit 412 and is decoded. The decoded data is stored in a background image memory 413, and thereafter, the content of the background image memory 413 is always output to a synthesizing circuit 414. When the movement region data is received, the movement region data is separated into outline data, encoded data in units of blocks, motion vector data, and conditional pixel replenishment data by a demultiplexing circuit 403. The demultiplexed data are respectively input to a contour decoding circuit 406, a decoding circuit 404, a variable delay circuit 410, and a write control circuit 411. The encoded data is decoded by the decoding circuit 404 in units of blocks, and the decoded data is output to an adder 405.

The motion vector data is input to the variable delay circuit 410, and a frame memory 409 then selects a block corresponding to the motion vector and inputs it to the adder 405. The adder 405 adds the block data and the decoded block data, and outputs sum data to the write control circuit 411 and the synthesizing circuit 414.

The contour data is decoded by the contour decoding circuit 406, and is input to a map forming circuit 407 for forming a map. The map data is supplied to the write control circuit 411, and is used for calculating an address of a significant block. The map data is also supplied to the synthesizing circuit 414. The synthesizing circuit 414 assigns the movement region data output from the adder 405 and the background data output from the background memory 413 to a movement region portion and a background region portion, respectively, thus synthesizing one frame image.

The write control circuit 411 calculates an address of a significant block in accordance with the map data input from the map forming circuit 407, and controls write access to a frame memory 408 with reference to the conditional pixel replenishment pixel supplement data. More specifically, when an input block is subjected to pixel supplement, the data output from the variable delay circuit 410 is written in the frame memory 408. When the input block is not subjected to conditional pixel replenishment, the data output from the adder 405 is written in the frame memory 408. The data in the frame memory 408 is transferred to the frame memory 409 in synchronism with a frame.

Figure 46:
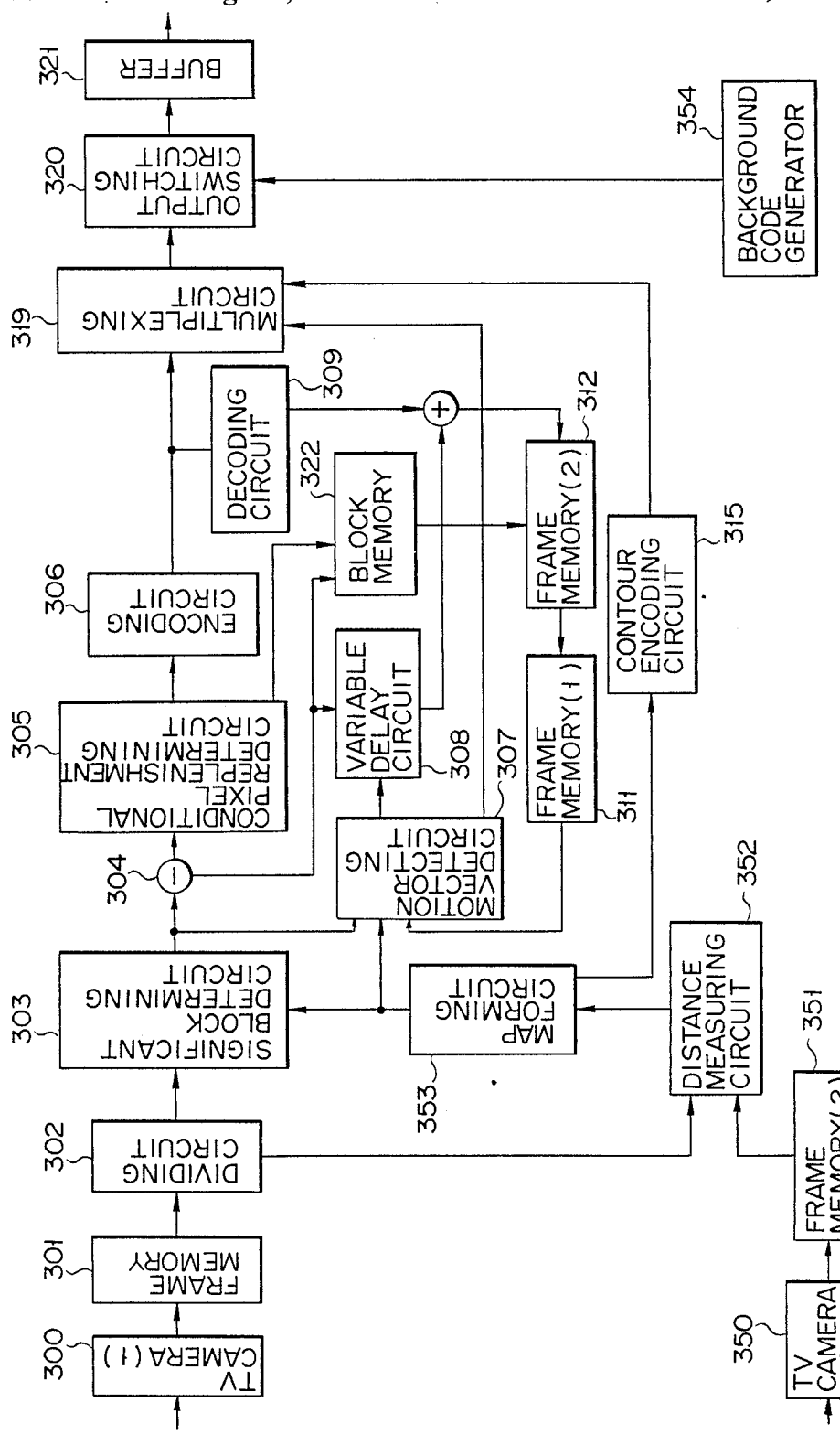
FIG. 46 is a block diagram of a transmitting section of an image encoding apparatus according to another embodiment.

Another embodiment of a transmitting section will be described below with reference to FIG. 46. In this embodiment, the same reference numerals denote the same parts as in FIG. 43, and a detailed description thereof will be omitted.

TV cameras 300 and 350 are arranged to have the same horizontal coordinate system and parallel optical axes. Image signals output from the TV cameras 300 and 350 are input to a distance measuring circuit 352 through frame memories 301 and 351. The distance measuring circuit 352 matches corresponding points of the two images. In this matching, distances between corresponding points in both the images are measured by. e.g., a three-dimensional measuring method described in "Image Processing Handbook (Morio Onoe)", Chapter 17. Based on the distance data, a map forming circuit 353 forms a map representing movement and background region data. In this embodiment, no background data is sent at all, and a fixed pattern designated by a background code generator 354 is displayed as a background of a receiving section.

Figure 47:
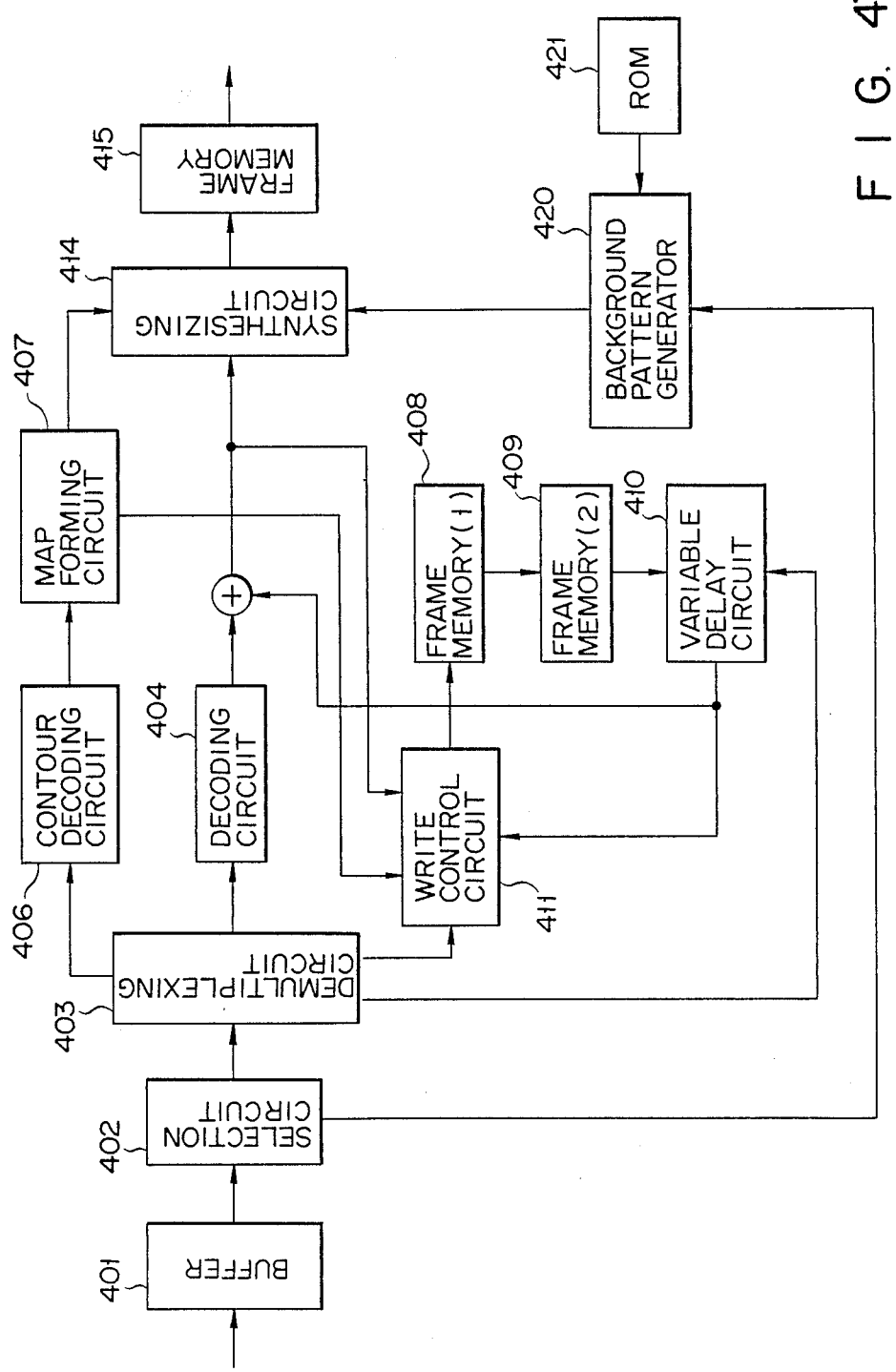
FIG. 47 is a block diagram of a receiving section corresponding to the transmitting section of the image encoding apparatus shown in FIG. 46.

A receiving section corresponding to the transmitting section shown in FIG. 46 will be described below with reference to FIG. 47. The same reference numerals in FIG. 47 denote the same parts as in the embodiment shown in FIG. 45, and a detailed description thereof will be omitted.

A background code sent from the transmitting section is supplied to a background pattern generator 420 through a buffer 401 and a selection circuit 402. The background pattern generator 420 selects background data corresponding to the background code from a ROM 421, and supplies the selected background pattern to a synthesizing circuit 414. The background codes and background images have a correspondence shown in FIG. 48. Background codes "00", "01", "10", and "11" respectively correspond to a gray background, blue background, black & white stripe background, and predetermined landscape background, and a background image is selected in accordance with a code.

In the embodiments shown in FIG. 43 and FIGS. 45 to 47, as a method of separating background and movement regions, the following three methods can be utilized:

(1) a method wherein a background memory for storing only a true background image by utilizing contour data of a movement region is arranged, and an input frame is compared with the content of the background memory;

(2) a method using an ultrasonic or infrared sensor; and (3) a method wherein distance measurement is performed using a stereoscopic image.

Still another embodiment of a transmitting section will be described below with reference to FIG. 50.

According to this embodiment, an input frame fetched by a frame memory 501 is divided into a plurality of blocks by a dividing circuit 502, and the blocks update a content of a background memory 504. Upon comparison between background data and the input frame, a map representing movement and background regions is formed by a map forming circuit 503.

A frame memory 506 stores movement image data read out from an external recording device 505 for storing image data including background data. The external recording device 505 comprises a recording device, e.g., a VTR (Video Tape Recorder), for outputting image data having the same format as that of frame image data input to the frame memory 501. Frame image data read out from the frame memory 506 is divided into a plurality of blocks by a dividing circuit 507. The block image data output from the dividing circuits 502 and 507 and map data output from the map forming circuit 503 are input to a background change circuit 508. A background change control circuit 514 determines whether the transmitting section receives background data from a camera or the external recording device 505 or the entire image is received from the external recording device 505, and outputs control data to the background change circuit 508. When the background change circuit 508 is designated to obtain background data from the external recording device 505 by the control data, pixels, which are designated as a background by the map, of the block input from the dividing circuit 502 are substituted with pixels at the same positions of the input block output from the dividing circuit 507, and the changed pixels are output to an encoding circuit 509. An encoding operation in the encoding circuit 509 is performed in the same manner as in the above embodiment.

According to the embodiment shown in FIG. 49, the following advantages can be obtained.

(1) Since true background data is not supplied, excessive data caused by a change in luminance of a background will not be generated.

(2) Another background as a substitute of a true background is displayed, so that confidentiality of a background and an image effect can be improved.

(3) Another image can be displayed when speech communication is held or a party on the other end of a line is being confirmed.

Still another embodiment will be described below with reference to FIG. 50.

An input image signal is divided into a plurality of blocks and the blocks are supplied to differential circuits 602 and 603 and a motion vector detecting circuit 614. The differential circuit 602 calculates a difference between a block signal and a motion-compensated interframe predictor signal output from the motion vector detecting circuit 614, and outputs predictor error data. The differential circuit 603 calculates a difference between an input block signal and a background predictor signal read out from a background predictor memory 615, and outputs predictor error data. These error data are input to a predictor selection circuit 604, and an RMS (root mean square) valve or absolute mean value is calculated therefrom. Thus, one of the two predictor errors is selected. The selected predictor error data is supplied to a multiplexing circuit 607 and a selection circuit 608. When the predictor selection circuit 604 selects the motion-compensated inter-frame prediction signal, the motion vector data output from the motion vector detecting circuit 614 is input to the multiplexing Circuit 607.

A transmission selection circuit 605 determines in accordance with a control signal output from a control signal generator 619 whether the predictor error signal or the content of a background memory 617 is sent to an encoding circuit 606. At the same time, a signal indicating a selected signal is supplied to the multiplexing circuit 607.

In the encoding circuit 606, an input signal is encoded, and the encoded signal is input to the multiplexing circuit 607 and a decoding circuit 610. The multiplexing circuit 607 adds, to the encoded signal in units of frames, header data which is output from the transmission selection circuit 605 and indicates that the predictor error is transmitted or the content of the background memory is transmitted. Furthermore, the multiplexing circuit 607 adds, to the encoded signal movement vector data, which is output from the predictor selection circuit 604 and indicates that a motion-compensated predictor or a background predictor is selected in units of blocks. An output from the multiplexing circuit 607 is temporarily stored in a buffer memory for synchronizing an output timing, and is then transmitted to a receiving section.

The prediction signal selected by the selection circuit 608 is selected by a selection signal output from the predictor selection circuit 604, and a signal output from a selected one of the motion vector detecting circuit 614 or the background predictor memory 615 is stored in a block memory 609 in units of blocks.

A signal decoded by the decoding circuit 610 and a signal read out from the block memory 609 are added to each other by an adder 611, and the sum signal is output as a signal having the same format as that of a decoded signal in the receiving section. The decoded signal is written in a frame memory 612 through a gate circuit 620 which is opened/closed under the control of the control signal generator 619. A signal output from the adder 611 is the same present frame signal as that in the receiving section, and is stored in the frame memory 612. In synchronism with this frame signal, the content of the frame memory 612 is transferred to a frame memory 613, and the content of the memory 613 is referred to by the motion vector detecting circuit 614 for storing the content of the immediately preceding frame.

The motion vector detecting circuit 614 detects a movement region on the basis of a block input from the dividing circuit 601 and a frame signal read out from the frame memory 613, and outputs a motion-compensated predictor block to the differential circuit 602 and the selection circuit 608 and outputs a movement vector to the predictor selection circuit 604.

The signal output from the decoding circuit 610 is stored in the background predictor memory 615 through the other gate circuit 616. The content of the background predictor memory 615 is the same as that of a background memory arranged in the receiving section. More specifically, only when the content of the background predictor memory 615 is rewritten by the content of the background memory 617, the gate circuit 616 is opened in response to the control signal from the control signal generator 619, and a background image is sequentially stored. More specifically, the control signal generator 619 detects the amount of the content of a buffer memory 618. When the amount of the content is small, the control signal generator 619 outputs a first control signal indicating that the content of the background memory 617 is transmitted. The control signal generator 619 detects a header indicating transmission of data from the background memory on the basis of the content of the buffer memory 618, opens the gate circuit 616 in response to this detection, and outputs a second Control signal indicating that the content of the background predictor memory 615 is rewritten with the content of the background memory 617.

Figure 45:
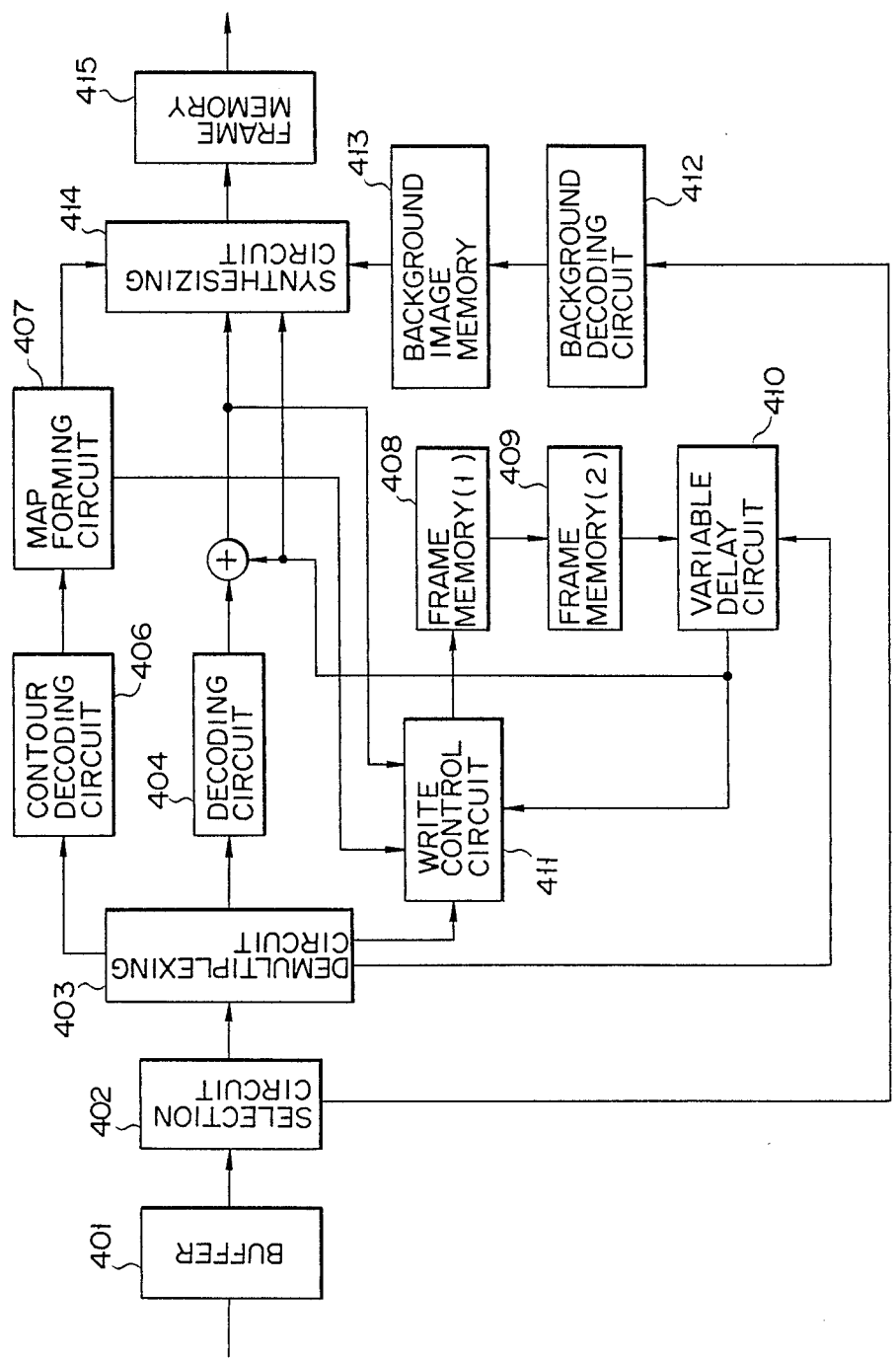
FIG. 45 is a block diagram of a receiving section corresponding to a transmitting section of the image encoding apparatus shown in FIG. 43.
Figure 50:
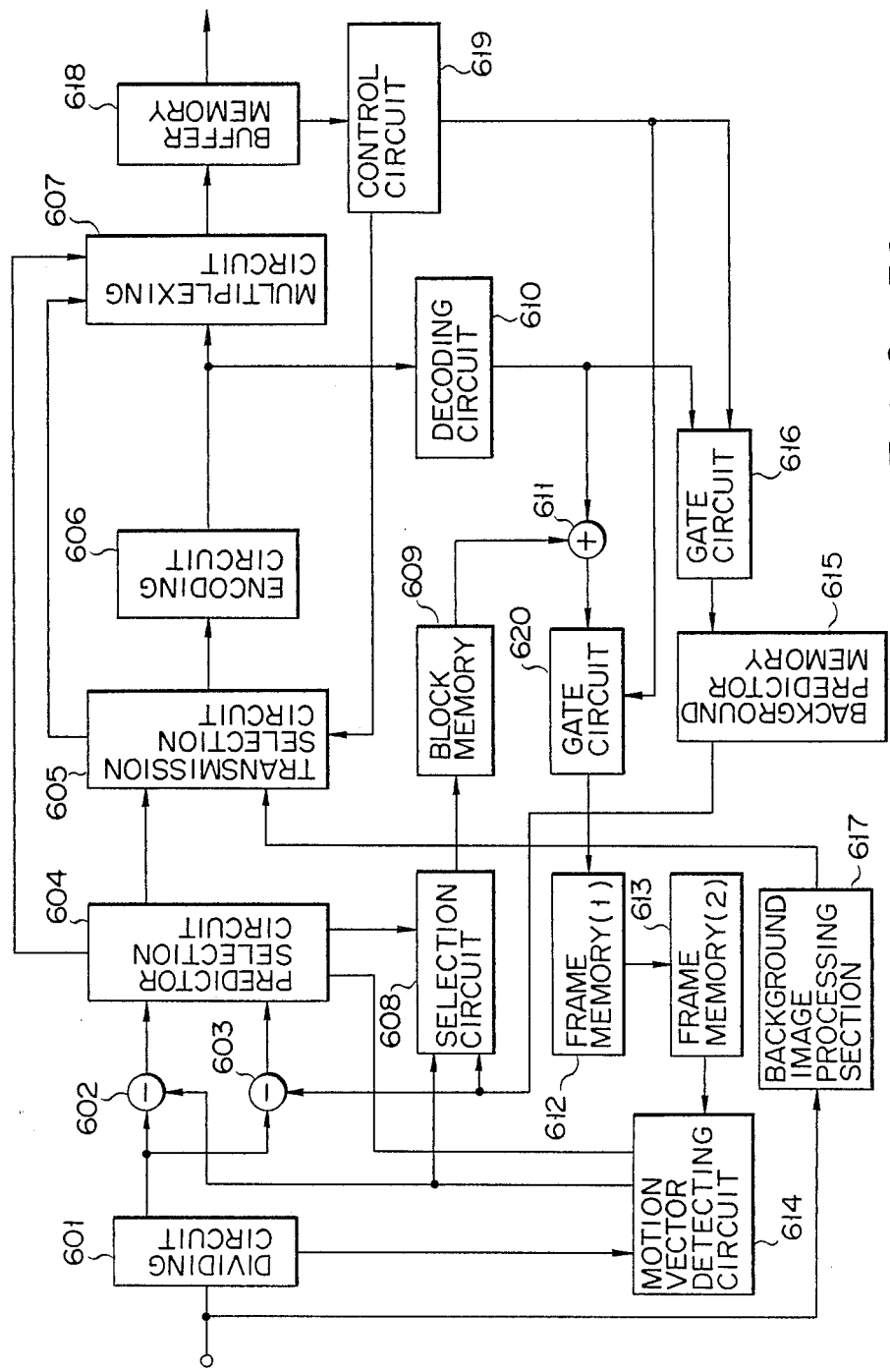
FIG. 50 is a block diagram of a transmitting section of an image encoding apparatus according to still another embodiment.

In the embodiment shown in FIG. 50, the background memory 617 is the same as that in the embodiment shown in FIG. 45, and a detailed description thereof will be omitted.

A receiving section will be described below with reference to FIG. 51.

A signal transmitted from the transmitting section is temporarily stored in a buffer memory 681, and is separated into an image signal, a reception selection signal, and a predictor selection signal by a separating circuit 682. Of the separated signals, the image signal is decoded by a decoding circuit 683, and the decoded signal is input to a selection circuit 684. When the reception selection signal is input to a reception selection control circuit 686, the reception selection control circuit 686 detects whether or not the presently receiving signal is data for updating a background memory. The predictor selection signal is separated into a motion vector signal used for motion vector detection, and a predictor selection signal by a predictor selection control circuit 687, and these signals are respectively input to a motion vector detecting circuit 689 and a predictor selection circuit 690. In the transmitting section, when a signal from the background predictor memory is selected, the motion vector is not included in a transmission signal.

When the reception selection control circuit 686 determines that the presently receiving data is data for updating the background memory, it outputs a control signal to the selection circuit 684. In response to the selection signal, the selection circuit 684 writes an image signal in a background predictor memory 688. In this case, the content of a background predictor memory 688 is the same as that of the background predictor memory 615 shown in FIG. 50. Thus, in the receiving section, a background image is sequentially completed in the background predictor memory 688.

The predictor selection circuit 690 selects the content of the background predictor memory 688 or the motion-compensated-detected predictor signal obtained by the motion vector detecting circuit 689 on the basis of the immediately preceding frame signal read out from a frame memory 692 in accordance with a selection signal output from the predictor selection control circuit 687. The selected signal is input to an adder 685, and is added to the output signal from the selection circuit 684. The sum signal from the adder 685 is input to a monitor, and is displayed thereon. In addition, the sum signal is stored in a frame memory 691 in units of blocks. The image signal stored in the frame memory 691 is stored in a frame memory 692 in units of frames.

In the above embodiment, a new input frame signal is compared with the content of the background memory without performing background prediction in accordance with movement, thereby easily identifying a portion other than a background.

What is claimed is:

1. An image encoding apparatus for encoding a plurality of image data corresponding to a movable object having a specific portion and sequentially produced for every frame, comprising:

storing means for storing the image data for every frame;

specific image extracting means for detecting a difference between at least two of the image data to obtain movement data representing a movement of the movable object and including specific movement data corresponding to the specific portion, and extracting the specific movement data from the movement data corresponding to the difference; and bit allocating means for allocating more bits to the image data corresponding to the extracted specific movement data than to the remaining image data.

2. An apparatus according to claim 1, wherein said specific image extracting means comprises subtracting means for calculating a difference between the image data read out from said storing means in units of frames, and outputting differential data corresponding to the movement data and including a plurality of pixels; means for comparing the differential data with a predetermined threshold value; means for detecting from the differential data the pixels each having a level exceeding a predetermined threshold value; means for determining the specific portion from information corresponding to the number of the pixels detected by said pixel detecting means and outputting the image data representing the specific portion to said bit allocating means.

3. An apparatus according to claim 1, wherein said specific image extracting means comprises subtracting means for calculating a difference between the image data read out from said storing means in units of frames, and outputting differential data; histogram forming means for forming at least X- and Y-axis histograms from the differential data; and coordinate data output means for determining coordinates corresponding to the specific portion from the X- and Y-axis histograms and outputting the coordinate data to said bit allocating means.

4. An apparatus according to claim 1, wherein said specific image extracting means comprises means for limiting a processing range of 1-frame image data read out from said storing means to a predetermined region by the coordinate data, labeling means for labeling the limited region, and means for extracting the specific image data in accordance with data output from said labeling means.

5. An apparatus according to claim 1, wherein said bit allocating means comprises means for dividing the image data read out from said storing means into a plurality of blocks and outputting a plurality of data blocks; means for comparing the data block and data block of the preceding image data, detecting movement of the specific portion from both the data blocks, and outputting movement data; selecting means for selecting data block corresponding to the movement data from the preceding image data; means for calculating a difference between the data block selected by said selecting means and the data block obtained by said dividing means and outputting block differential data; and determining/encoding means for determining a movement region on the basis of the block differential data and the movement data and encoding the data block corresponding to the movement region by a predetermined number of bits.

6. An apparatus according to claim 5, wherein said determining/encoding means encodes the data block by different numbers of bits, to form a plurality of encoded data blocks, and which further comprises means for selecting one of the encoded data blocks output from said determining/encoding means.

7. An apparatus according to claim 1, wherein said specific image extracting means comprises subtracting means for calculating a difference between the image data read out from said storing means in units of frames, and outputting difference data; means for comparing the differential data with a predetermined threshold value; histogram forming means for forming at least X- and Y-axis histograms, by means of a comparison result obtained by said comparing means; and coordinate data output means for determining coordinates corresponding to the specific portion from the X- and Y-axis histograms and outputting the coordinate data to said bit allocating means.

8. An apparatus according to claim 7, wherein the image data is formed by a predetermined block including a number of pixels, said histogram forming means comprises counting means for counting pixels corresponding to the differential data and exceeding a threshold value and means for forming the histograms by sequentially storing the count values of said counting means.

9. An apparatus according to claim 7, wherein said coordinate data output means comprises mean value means for calculating means for comparing the Y- and X-axis histograms, and means for comparing the Y- and X-axis histograms on the basis of the means values and detecting changes in histograms below the mean values.

10. An image encoding apparatus for encoding a plurality of image data corresponding to a movable object having a specific portion and sequentially produced for every frame, comprising:

storing means for storing the image data for every frame;

specific image extracting means for outputting differential data corresponding to a difference between at least two of the image data to obtain movement data representing a movement of the movable object and including specific movement data corresponding to the specific portion, and extracting specific movement data from the movement data corresponding to the differential data;

buffer means for matching a generated data amount with an output data amount;

encoding means for encoding the specific movement data and outputting encoded data;

parameter generating means for generating a quantization parameter according to the specific movement data extracted by said extracting means and a remaining amount of said buffer means;

means for quantizing the encoded data output from said encoding means in accordance with the quantization parameter so as to allocate more bits to the specific image data than to the remaining image data, and outputting quantized data; and output means for converting the quantized data to output data and outputting the output data to said buffer means.

11. An apparatus according to claim 10, wherein said parameter generating means comprises means for outputting quantizing step size data corresponding to the buffer amount, means for multiplying the quantizing step size data with one and a predetermined value $\alpha$ ($\alpha > 1$) and outputting one- and predetermined number-fold quantizing step size data, and means for selecting the one- and predetermined number-fold quantizing step size data in accordance with the differential data and outputting the selected data to said quantizing means.

12. An apparatus according to claim 10, wherein said storing means stores image data corresponding to a human body including a head portion and a background, and said specific image extracting means comprises subtracting means for calculating a difference between the image data read out from said storing means for every frame and the preceding image data, and outputting difference data, means for forming at least X- and Y-axis histograms on the basis of the differential data, and coordinate data output means for determining coordinates corresponding to a vertex and side surfaces of the head portion and outputting coordinate data to said bit allocating means.

13. An apparatus according to claim 10, wherein said output means scan-converts the quantized data from sad quantizing means in accordance with the specific image data and decreasing the number of bits allocated to a region other than the specific image data.

14. An image encoding apparatus comprising:
generating means for generating a plurality of image data corresponding to a movable object having a specific portion and sequentially produced for every frame;
encoding means for encoding the image data and outputting encoded image data;
specific portion detecting means for detecting a difference between at least two of the image data to obtain movement data representing a movement of the movable object and including specific movement data corresponding to the specific portion, and outputting specific region data corresponding to the specific movement data from the image data;
determining means for comparing the specific region data with predetermined data to determine the validity of the specific region data, and outputting determination data; and
means for supplying the specific region data to said encoding means in response to the determination data from said determining means so that more bits are allocated to the image data corresponding to the specific portion than to remaining image data to encode the image data.

15. An apparatus according to claim 14, further comprising storing means for storing preceding specific region data and means for enlarging the specific region data stored in said storing means in accordance with a predetermined rule.

16. An image encoding apparatus comprising:
storing means for storing image data corresponding to an object having a specific portion for every frame;
means for dividing the image data into a plurality of blocks including M × N pixels;
predictor output means for predicting a pixel corresponding to each corner of each of said blocks with reference to already encoded pixels which are included in other adjacent blocks, and outputting a predictor; and
quantizing/encoding means for detecting an error between the predictor and an actual value of the pixel, and quantizing and encoding differential data corresponding to the error in accordance with a relationship between the error and a predetermined value,
wherein said predictor output means predicts a pixel other than the corner pixel with reference to the corner pixel and pixels in other blocks adjacent to the corner pixel, and
said quantizing/encoding means detects an error between the predictor and the actual value of the pixel, and quantizes and encodes differential data corresponding to the error in accordance with the relationship between the error and a predetermined value.

17. An apparatus according to claim 16, wherein said predictor output means comprises means for obtaining a predictor on the basis of an already encoded pixel which is adjacent to a pixel to be predicted in view of a space and time.

18. An apparatus according to claim 16, wherein said quantizing/encoding means comprises means for quantizing data indicating a value exceeding a predetermined threshold value or a threshold value corresponding to an output buffer amount at equal intervals or unequal intervals.

19. An image transmission apparatus comprising:
image data output means for generating image data of a movement region of an input image;
difference image output means for outputting a difference image of images of two adjacent frames of the input image;
detecting means for detecting an outline of the movement region in the difference image output from the difference image output means;
first storing means for storing input image data outside the outline of the movement region detected by said detecting means as a background while updating the stored data;
transmitting means for transmitting the background image data stored in said first storing means and the movement region image data;
receiving means for receiving the movement region image data and the background image data transmitted from said transmitting means;
means for reproducing the received movement region image data;
second storing means for storing the received background image data until new background data is received;
synthesizing means for synthesizing the background image data stored in said second storing means and the reproduced movement region image data; and
means for outputting the movement region image data and the background image data synthesized by said synthesizing means;
wherein said image data output means divides the input image into a plurality of blocks, and performs motion compensated coding with reference to only pixels other than a background in each block.

20. An image transmission apparatus comprising:

image data output means for generating image data of a movement region of an input image;

difference image output means for outputting a difference image of images of two adjacent frames of the input image;

detecting means for detecting an outline of the movement region in the difference image output from the difference image output means;

first storing means for storing input image data outside the outline of the movement region detected by said detecting means as a background while updating the stored data;

transmitting means for transmitting the background image data stored in said first storing means and the movement region image data;

receiving means for receiving the movement region image data and the background image data transmitted from said transmitting means;

means for reproducing the received movement region image data;

second storing means for storing the received background image data until new background data is received;

synthesizing means for synthesizing the background image data stored in said second storing means and the reproduced movement region image data; and means for outputting the movement region image data and the background image data synthesized by said synthesizing means;

wherein said image data output means divides the input image into a plurality of blocks, and performs transform coding while substituting a luminance value of a background in each block with a value determined by a predetermined rule.

* * * * *